United States Patent
Rosdahl, Jr. et al.

(10) Patent No.: US 10,213,958 B2
(45) Date of Patent: Feb. 26, 2019

(54) ELECTROSTATIC 3-D PRINTING SYSTEM HAVING ACOUSTIC TRANSFER AND COROTRON

(71) Applicant: Xerox Corporation, Norwalk, CT (US)

(72) Inventors: Robert E. Rosdahl, Jr., Ontario, NY (US); Robert R. Reed, West Henrietta, NY (US); Christine A. Steurrys, Williamson, NY (US); Richard P. Ficarra, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 310 days.

(21) Appl. No.: 15/147,971

(22) Filed: May 6, 2016

(65) Prior Publication Data

US 2017/0320271 A1    Nov. 9, 2017

(51) Int. Cl.
*B29C 64/264* (2017.01)
*B33Y 30/00* (2015.01)
*B29C 64/295* (2017.01)
*B29C 64/393* (2017.01)
*G03G 15/16* (2006.01)
*G03G 15/22* (2006.01)
(Continued)

(52) U.S. Cl.
CPC .......... *B29C 64/264* (2017.08); *B29C 64/141* (2017.08); *B29C 64/295* (2017.08); *B29C 64/393* (2017.08); *B33Y 10/00* (2014.12); *B33Y 30/00* (2014.12); *G03G 15/1625* (2013.01); *G03G 15/225* (2013.01); *G03G 15/24* (2013.01); *B29K 2091/00* (2013.01); *G03G 15/161* (2013.01); *G03G 2215/1695* (2013.01)

(58) Field of Classification Search
CPC ... B29C 64/264; B29C 64/295; B29C 64/393; B29C 64/153; B29C 64/165; G05B 19/4099
See application file for complete search history.

(56) References Cited

U.S. PATENT DOCUMENTS

| | | |
|---|---|---|
| 4,063,808 A | 12/1977 | Simpson |
| 4,100,884 A | 7/1978 | Mochizuki et al. |

(Continued)

FOREIGN PATENT DOCUMENTS

| | | |
|---|---|---|
| CN | 104890241 A | 9/2015 |
| WO | 2015133641 A1 | 9/2015 |

OTHER PUBLICATIONS

U.S. Appl. No. 15/147,997, Restriction Requirement dated Aug. 15, 2018, pp. 1-8.

(Continued)

*Primary Examiner* — Joseph S Del Sole
*Assistant Examiner* — John Robitaille
(74) *Attorney, Agent, or Firm* — Gibb & Riley, LLC

(57) ABSTRACT

3-D printers include a transfuse station having at least one roller on one side of the ITB supporting the ITB, and a transmission device on the same side of the ITB. A platen is included that moves relative to the ITB. The ITB electrostatically transfers a layer made up of the different color build materials and the support material to the platen each time the platen contacts the other side of the ITB at the transfuse station (the side of the ITB opposite the transfuse station roller and transmission device) using vibration and charge devices; and this successively forms multiple layers of the build materials and the support material on the platen.

20 Claims, 26 Drawing Sheets

(51) Int. Cl.
  *G03G 15/24* (2006.01)
  *B33Y 10/00* (2015.01)
  *B29C 64/141* (2017.01)
  *B29K 91/00* (2006.01)

(56) References Cited

U.S. PATENT DOCUMENTS

| | | | |
|---|---|---|---|
| 4,187,774 A * | 2/1980 | Iwasa | G03G 15/1625 |
| | | | 101/41 |
| 4,510,223 A * | 4/1985 | Kuehnle | G03G 15/0163 |
| | | | 430/45.2 |
| 4,987,456 A | 1/1991 | Snelling et al. | |
| 5,016,055 A | 5/1991 | Pietrowski et al. | |
| 5,088,047 A | 2/1992 | Bynum | |
| 5,103,263 A | 4/1992 | Moore et al. | |
| 5,282,006 A | 1/1994 | Fletcher | |
| 5,339,147 A | 8/1994 | Snelling et al. | |
| 5,477,315 A | 12/1995 | Mashtare | |
| 5,966,559 A | 10/1999 | May et al. | |
| 6,066,285 A | 5/2000 | Kumar | |
| 6,141,524 A | 10/2000 | Berkes et al. | |
| 6,157,804 A | 12/2000 | Richmond et al. | |
| 6,775,504 B2 | 8/2004 | Godlove et al. | |
| 7,184,698 B2 | 2/2007 | Tombs | |
| 7,250,238 B2 | 7/2007 | Fromm et al. | |
| 7,270,408 B2 | 9/2007 | Odell et al. | |
| 7,851,549 B2 | 12/2010 | Sacripante et al. | |
| 8,265,536 B2 | 9/2012 | Condello et al. | |
| 8,306,443 B2 | 11/2012 | DiRubio et al. | |
| 8,396,404 B2 | 3/2013 | Tabb et al. | |
| 8,470,231 B1 | 6/2013 | Dikovksy et al. | |
| 8,488,994 B2 | 7/2013 | Hanson et al. | |
| 8,548,621 B2 | 10/2013 | Gross et al. | |
| 8,718,522 B2 | 5/2014 | Chillscyzn et al. | |
| 8,836,911 B2 | 9/2014 | Flores et al. | |
| 8,879,957 B2 | 11/2014 | Hanson et al. | |
| 9,029,058 B2 | 5/2015 | Martin | |
| 9,193,110 B2 | 11/2015 | Pridoehl et al. | |
| 2008/0131800 A1 | 6/2008 | Marsh et al. | |
| 2010/0140849 A1 | 6/2010 | Comb et al. | |
| 2010/0227184 A1 | 9/2010 | Swift et al. | |
| 2012/0276233 A1 | 11/2012 | Napendensky | |
| 2013/0075013 A1 | 3/2013 | Chillscyzn et al. | |
| 2013/0078013 A1 | 3/2013 | Chillscyzn et al. | |
| 2013/0186558 A1 | 7/2013 | Comb et al. | |
| 2014/0134334 A1 | 5/2014 | Pridoehl et al. | |
| 2015/0024169 A1 | 1/2015 | Martin | |
| 2015/0024309 A1 | 1/2015 | Martin | |
| 2015/0024317 A1 * | 1/2015 | Orrock | G03G 9/08768 |
| | | | 430/108.3 |
| 2015/0142159 A1 | 5/2015 | Chang | |
| 2015/0145174 A1 | 5/2015 | Comb | |
| 2015/0266241 A1 | 9/2015 | Batchelder | |
| 2015/0352786 A1 * | 12/2015 | Pruett | B29C 67/0077 |
| | | | 428/426 |
| 2016/0243764 A1 | 8/2016 | Hays et al. | |
| 2017/0015063 A1 | 1/2017 | Hanyu et al. | |
| 2017/0192377 A1 | 7/2017 | Batchelder et al. | |
| 2017/0299973 A1 | 10/2017 | Frauens | |

OTHER PUBLICATIONS

European Application No. 17169600.8, European Search Report dated Sep. 7, 2017, pp. 1-7.
U.S. Appl. No. 15/152,659, Restriction Requirement dated Dec. 26, 2017, pp. 1-6.
U.S. Appl. No. 15/152,659, Office Action Communication dated Feb. 22, 2018, pp. 1-16.
U.S. Appl. No. 15/152,659, Office Action Communication dated Jun. 19, 2018, pp. 1-20.
U.S. Appl. No. 15/152,659, Advisory Action dated Aug. 28, 2018, pp. 1-3.
U.S. Appl. No. 15/152,631, Restriction Requirement dated Nov. 15, 2017, pp. 1-7.
U.S. Appl. No. 15/152,631, Office Action Communication dated Dec. 20, 2017, pp. 1-9.
U.S. Appl. No. 15/152,631, Office Action Communication dated May 2, 2018, pp. 1-26.
U.S. Appl. No. 15/152,631, Notice of Allowance Communication dated Jul. 6, 2018, pp. 1-8.
U.S. Appl. No. 16/059,496, Office Action Communication dated Dec. 13, 2018, pp. 1-10.
U.S. Appl. No. 15/147,997, Notice of Allowance dated Oct. 3, 2018, pp. 1-12.
U.S. Appl. No. 15/152,659, Notice of Allowance dated Oct. 3, 2018, pp. 1-6.

* cited by examiner

ELECTROSTATIC 3-D PRINTING SYSTEM HAVING ACOUSTIC TRANSFER AND COROTRON

BACKGROUND

Systems and methods herein generally relate to three-dimensional (3-D) printing processes that use electrostatic printing processes.

Three-dimensional printing can produce objects using, for example, ink-jet or electrostatic printers. Support materials are used to keep build materials in a desired pattern, and support materials generally comprise acid-, base- or water-soluble polymers, which can be selectively rinsed from the build material after 3-D printing is complete.

The electrostatic (electro-photographic) process is a well-known means of generating two-dimensional digital images, which transfer materials onto an intermediate surface (such as a photoreceptor belt or drum). Advancements in the way an electro-photographic image is transferred can leverage the speed, efficiency and digital nature of printing systems.

SUMMARY

Exemplary three-dimensional (3-D) printers include, among other components, different color development stations positioned to electrostatically transfer different colored build materials to an intermediate transfer belt (ITB); and at least one support material development station positioned to electrostatically transfer support material to a location of the ITB where the build materials are located on the ITB. For example, each different development station can provides a color of build material that is different from the colors of the build materials supplied by other development stations. The color of the support material is not highly relevant because the support material dissolves in different solvents (relative to solvents that dissolve the build materials) and is eventually removed from the final structure.

In addition, these printers include a transfuse station having at least one roller on one side of the ITB supporting the ITB, and a transmission device on the same side of the ITB. A platen is included that moves relative to the ITB. The ITB electrostatically transfers a layer made up of the different color build materials and the support material to the platen each time the platen contacts the other side of the ITB at the transfuse station (the side of the ITB opposite the transfuse station roller and transmission device); and this successively forms multiple layers of the build materials and the support material on the platen. Each of the layers is on a discrete area of the ITB and is in a pattern before transfer to the platen.

The transmission device can be an acoustic device transmission vibrating the ITB using acoustic waves. In other words, the transmission device physically vibrates the layers off the ITB and on to the platen. Also, with these printers, a heater is adjacent the platen; and the platen moves to the heater to heat the layers and join each of the layers together. Additionally, a pressure roller is adjacent the heater. The platen moves to the pressure roller to press each of the layers together.

A charge generator is positioned adjacent the transfuse station in a location to transfer a charge to the layers on the platen (e.g., the top layer in the stack) after the heater heats the layers and the pressure roller presses the layers. The charge generator can be any type of charge generating device, such as a corona charge device generating charges and projecting the charges. The charge generated by the charge generator is opposite the charge of particles of the build materials and the support material on the ITB.

In one example, if the build materials are UV curable, a curing station is positioned to apply UV light to the 3-D structure to cure the layers to one another on the platform. The curing station can apply UV light after each time the ITB transfers each of the layers to the platen, or can apply UV light to groups of layers. In the case of a UV curable toner, the heater and pressure roller mentioned above may not be needed.

In additional options, these 3-D printers can also include a support material removal station positioned to receive the 3-D structure from the platform. The support material removal station applies a solvent that dissolves the support material without affecting the build materials to leave the 3-D structure made of only the build materials. However, other methods that do not require solvent would not use such a support material removal station. For example, some materials could melt or disintegrate with high heat, instead of using solvents.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, electrostatic printing process are well-known means of generating two-dimensional (2-D) digital images, and the methods and devices herein use such processing for the production of 3-D items (for 3-D printing). However, when performing 3-D printing using electrostatic processes (especially those that use an ITB), the mechanical integrity of the printed material may be compromised if it is very thin, and the transfer process can impose stripping shear forces that damage or smear the material. Also, transfer of newly developed layers on the ITB to the existing layers on the platen can become difficult using only electrostatic forces, especially as the stack of layers on the platen grows and becomes taller.

Figure 1:
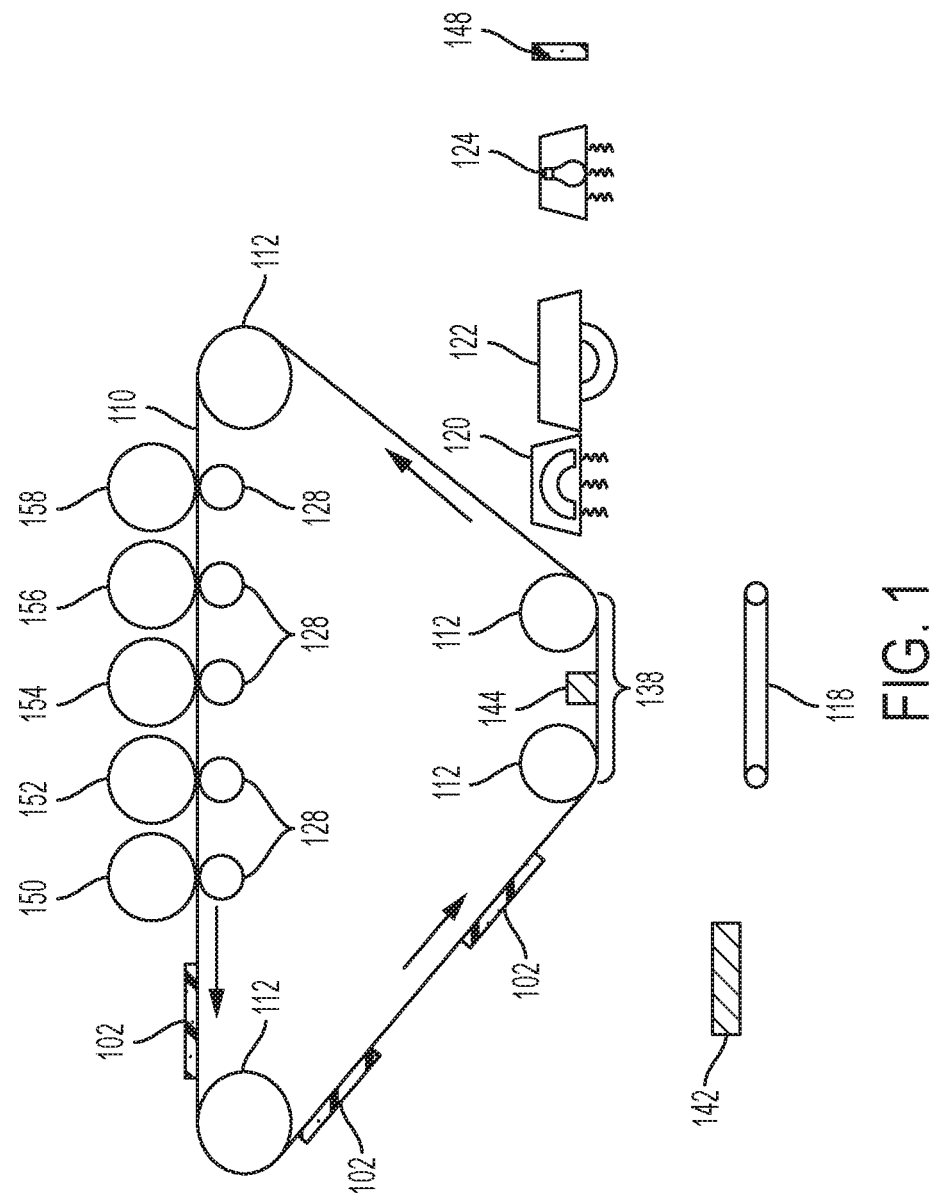
FIGS. 1-5 are schematic cross-section diagrams partially illustrating devices herein.

In order to address such issues, as shown, for example, in FIG. 1, exemplary three-dimensional (3-D) printers herein include, among other components, different build material color development stations 152-158 positioned to electrostatically transfer different colored build materials to an intermediate transfer surface, such as an intermediate transfer belt (ITB 110); and at least one support material development station 150 positioned to electrostatically transfer support material to a location of the ITB 110 where the build materials are located on the ITB 110. For example, each different development station 150 can provide a color of build material that is different from the colors of the build materials supplied by other development stations 152-158. The color of the support material is not highly relevant because the support material dissolves in solvents that do not affect the build materials, and is eventually removed from the final structure, as discussed below.

In addition, these printers include a transfuse station 138 having at least one roller 112 on one side of the ITB 110 supporting the ITB 110, and a transmission device 144 on the same side of the ITB 110 that aids transfer of the build and support materials to the platen 118. Further, a charge generator 142 is positioned adjacent the transfuse station 138.

As shown in FIGS. 2-5, the ITB 110 electrostatically transfers a layer 102 made up of the different color build materials and the support material to the platen 118 each time the platen 118 contacts the other side of the ITB 110 at the transfuse station 138 (the side of the ITB 110 opposite the transfuse station roller(s) 112 and transmission device 144); and this successively forms multiple layers 102 of the build materials and the support material on the platen 118. Each of the layers 102 is formed by the development stations 150-158 on a discrete area of the ITB 110 and is formed in a pattern before transfer to the platen 118.

The ITB 110 can be a flat, continuous belt supported on rotating rollers 112. A movable platen 118 (which can be a surface or belt) is adjacent the ITB 110. Also, such structures include a heater 120, a pressure roller 122, and a curing station 124 that is positioned to apply light (e.g. UV light) using a light source. The structure can also include an optional support material removal station 148.

Figure 2:
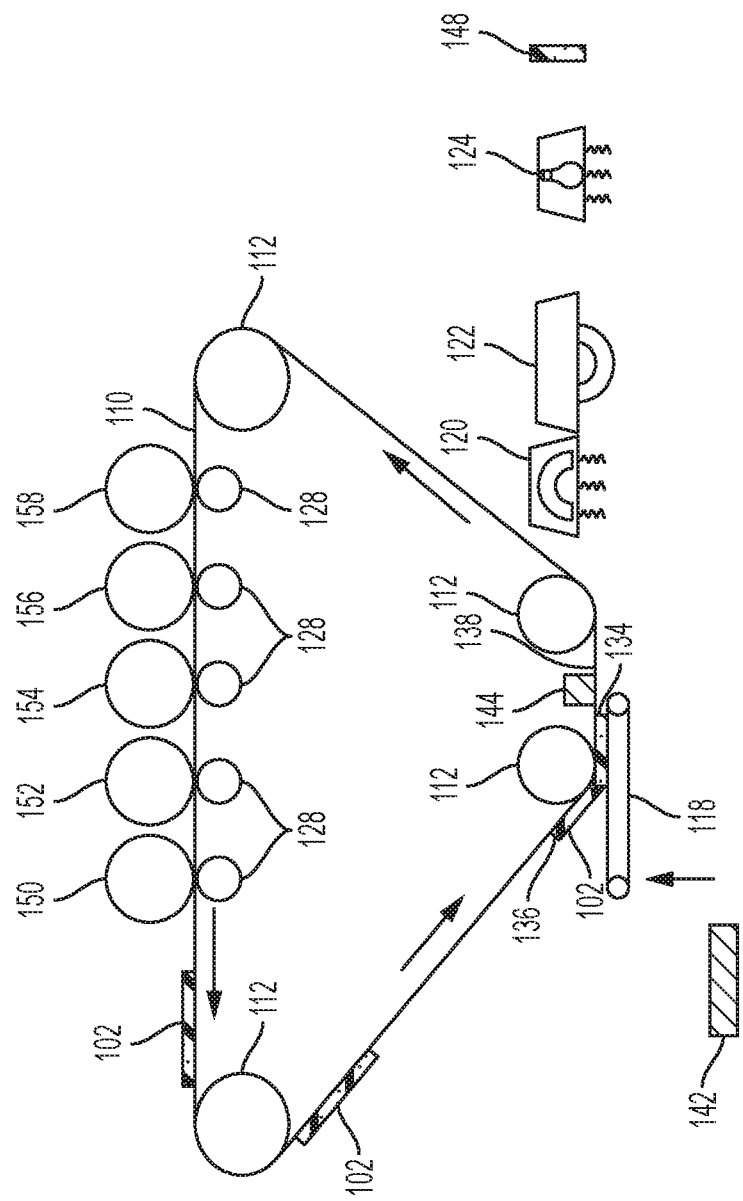

As shown in FIG. 2, the color build material development devices 152-158 are positioned to electrostatically transfer (by way of charge difference between the belt and the material being transferred) build material, such as a (potentially dry) powder polymer-wax material (e.g., charged 3-D toner) to the ITB 110, and the support material development device 150 is positioned to also electrostatically transfer a different material (e.g., the support material, again such as a powder polymer-wax material (e.g., charged 3-D toner)) to a location of the ITB 110 where the build material is located on the ITB 110. ( ) The support material dissolves in different solvents relative to solvents that dissolve the build material to allow the printed 3-D structure formed of the build material to be separated from the support material used in the printing process. In the drawings, the combination of the build material and the support material is shown as element 102, and is sometimes referred to as a developed layer. The developed layer 102 of the build material and the support material is on a discrete area of the ITB 110 and is in a pattern corresponding to the components of the 3-D structure in that layer (and its associated support elements), where the 3-D structure is being built, developed layer 102 by developed layer 102.

As shown by the vertical arrow in FIG. 2, the platen 118 moves (using motors, gears, pulleys, cables, guides, etc. (all generally illustrated by item 118)) toward the ITB 110 to have the platen 118 make contact with the ITB 110. Additionally, the platen may or may not make physical contact with the ITB 110. The electrostatic charge and acoustic transfer will allow developed material to jump the small gap at the transfuse station, which can lead to a better image than a physical transfer process. The ITB 110 electrostatically transfers one of the developed layers 102 of the build material and the support material to the platen 118 each time the platen 118 contacts the ITB 110, to successively form developed layers 102 of the build material and the support material on the platen 118. As discussed below, after the first layer 102 is transferred, the ITB 110 no longer contacts the platen 118, it contacts the previous layer.

Such build and support material are printed in a pattern on the ITB by each separate development device 150-158, and combine together in the developed layers 102 to represent a specific pattern having a predetermined length. Thus, each of the developed layers 102 has a leading edge 134 oriented toward the processing direction in which the ITB 110 is moving (represented by arrows next to the ITB 110) and a trailing edge 136 opposite the leading edge 134.

More specifically, as shown in FIG. 2, at the transfuse station 138, the leading edge 134 of the developed layer 102 within the transfuse station 138 begins to be transferred to a corresponding location of the platen 118. Thus, the platen 118 moves to contact the developed layer 102 on the ITB 110 at a location where the leading edge 134 of the developed layer 102 is at the lowest location of the roller 112 of the transfuse station 138. Thus, in this example, the trailing edge 136 of the developed layer 102 has not yet reached the transfuse station 138 and has not, therefore, yet been transferred to the platen 118.

Figure 3:
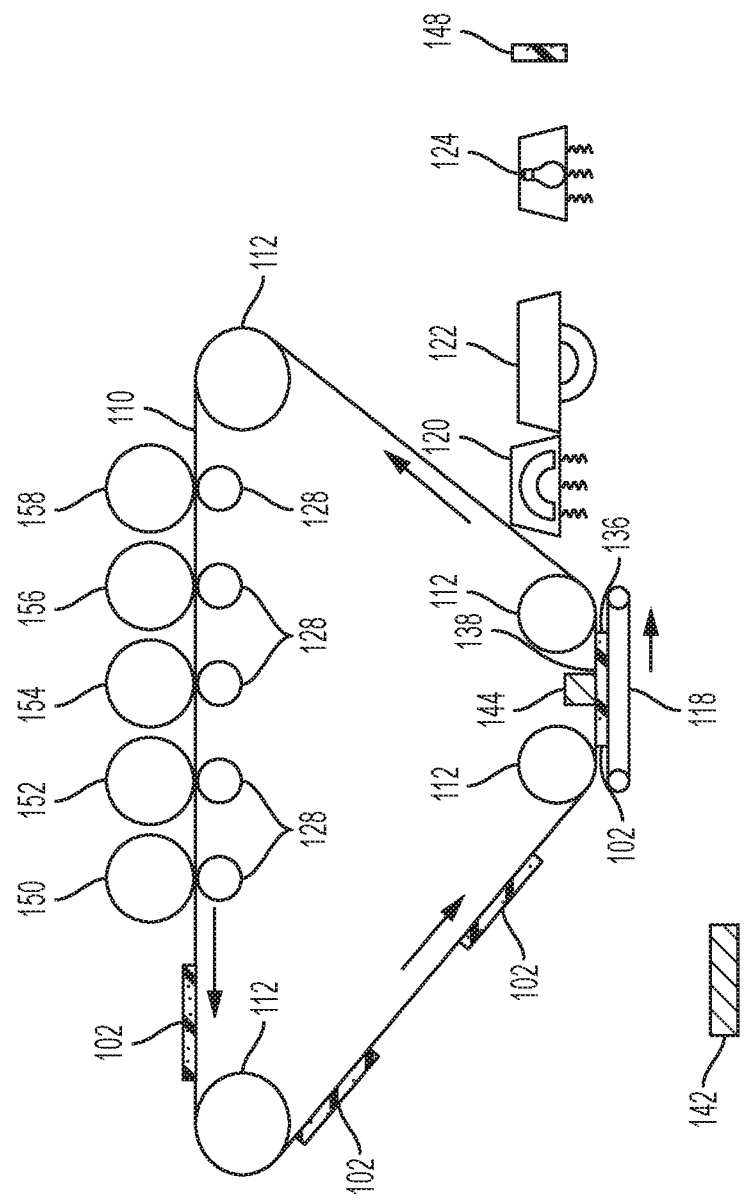

As shown in FIG. 3, the platen 118 can move synchronously with the ITB 110 (moves at the same speed and the same direction as the ITB 110) to allow the developed layers 102 to transfer cleanly to the platen 118, without smearing. In other alternatives, rather than contacting the ITB 110 as the layer 102 approaches in the transfuse station 138 as shown in FIG. 2, instead processing can move the platen 118 into the position shown in FIG. 3 when first making contact between the platen 118 and the layer of developed material 102 on the ITB 110.

Figure 4:
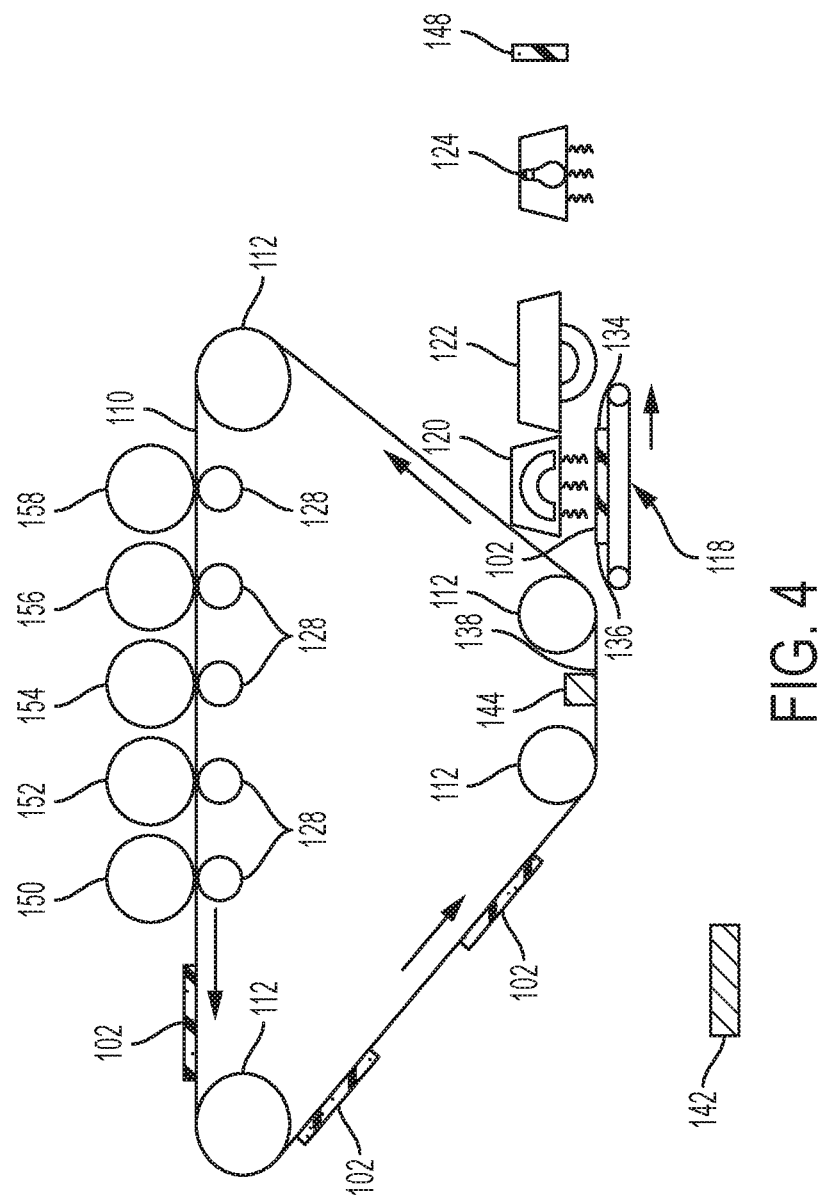

Then, as the ITB 110 moves in the processing direction, the platen 118 moves at the same speed and in the same direction as the ITB 110, until the trailing edge 136 of the developed layer 102 reaches the end of the transfuse station 138, at which point the platen 118 moves away from the ITB 110 and over to the heater 120, as shown in FIG. 4 (the heater 120 can be a non-contact (e.g., resistive heater, infrared (IR) heater, etc.) which lightly bonds the layer 102 to the platen.

Figure 5:
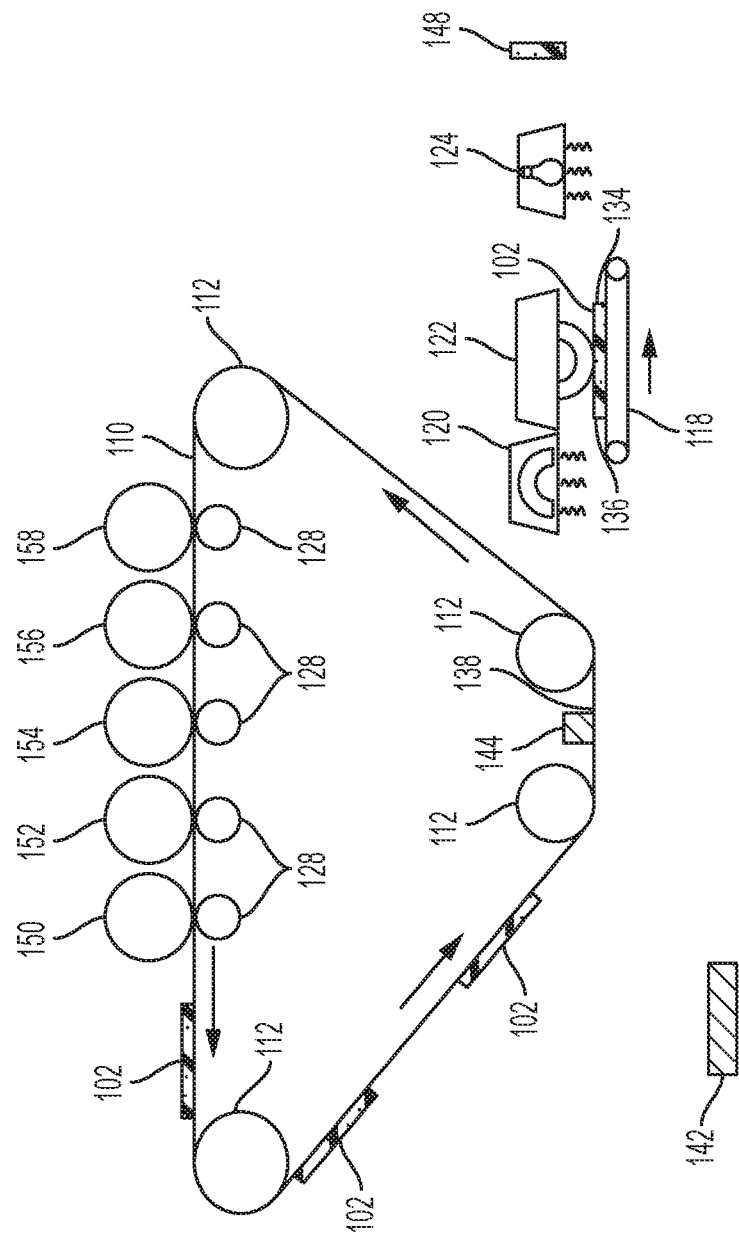

As shown in FIG. 5, the platen 118 then moves to the pressure roller 122 (which can also be heated) and moves synchronously as the pressure roller 122 rotates, potentially heating and pressing the developed layer 102 to lightly bond the developed layer 102 to the platen 118 (or to any previously transferred layers 102 existing on the platen 118). This synchronous movement between the platen 118 and the ITB 110 (and pressure roller 122) causes the pattern of support and build materials (102) that is printed by the development devices 150-158 to be transferred precisely from the ITB 110 to the platen 118, without distortion or smearing.

The platen 118 can move to the heater 120, pressure roller 122, and/or curing station 124, after each time the ITB 110 transfers each of the developed layers 102 to the platen 118 to independently heat, press, and cure each of the developed layers 102 and successively join each the developed layer 102 to the platen 118 and to any previously transferred developed layers 102 on the platen 118. In other alternatives, the platen 118 may only move to the heater 120, pressure roller 122, and/or curing station 124 after a specific number (e.g., 2, 3, 4, etc.) of the developed layers 102 have been placed on the platen 118 to allow multiple developed layers 102 to be simultaneously bonded to the platen 118 and to each other by the heater 120 and/or pressure roller 122.

Additionally, the platen 118 can pass by a cooling station before returning to the transfuse station 138.

Figure 6:
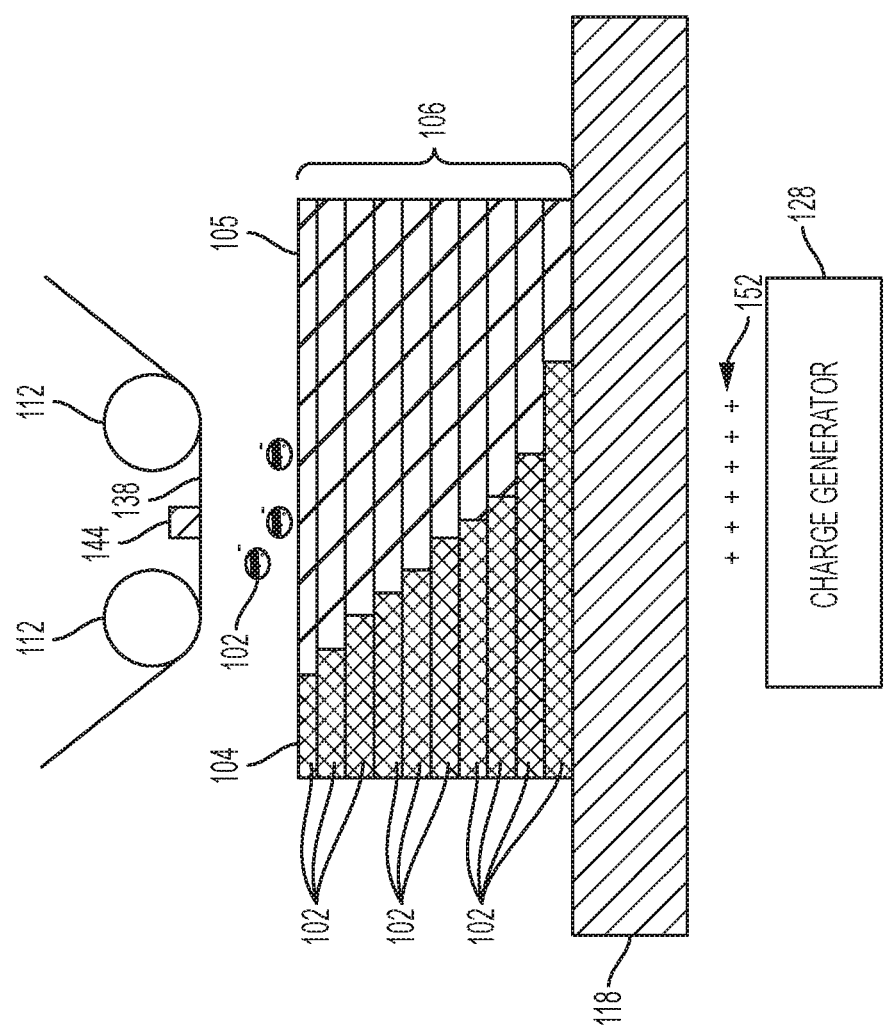
FIG. 6 is an expanded schematic diagram illustrating devices herein.

Thus, the processing in FIGS. 2-5 is repeated to fuse or bond multiple developed layers 102 to the platen 118 (and to one another), as shown in FIG. 6. FIG. 6 is an expanded diagram showing how the developed layers 102 may contain some of the build material 104 and some of the support material 105, and how the lowest developed layer 102 is joined to the platen 118, and how each successive developed layer 102 contacts and is joined to the immediately preceding adjacent developed layer 102 that is below (e.g., is between the layer 102 and the platen 118) to form a stack 106 of developed layers 102 on the platen 118.

As noted above, the particles of build materials 104 and support material 105 within each developed layer 102 (shown as particles (not drawn to scale) in FIG. 6, using identification number 102) are charged particles, and FIG. 6 shows these items as negatively charged particles (or they could be positively charged). As is understood by those ordinarily skilled in the art, the printing components 150-158 provide the charge to the particles 102 in order to have such particles electrostatically transfer to the ITB 110. A charge generator 128 can be used to create an opposite charge 152 (in this case a positive charge) on the opposite side of the platen 118, and this opposite charge 152 draws the charged particles 102 from the ITB 110 to the top of the stack 106.

Figure 7:
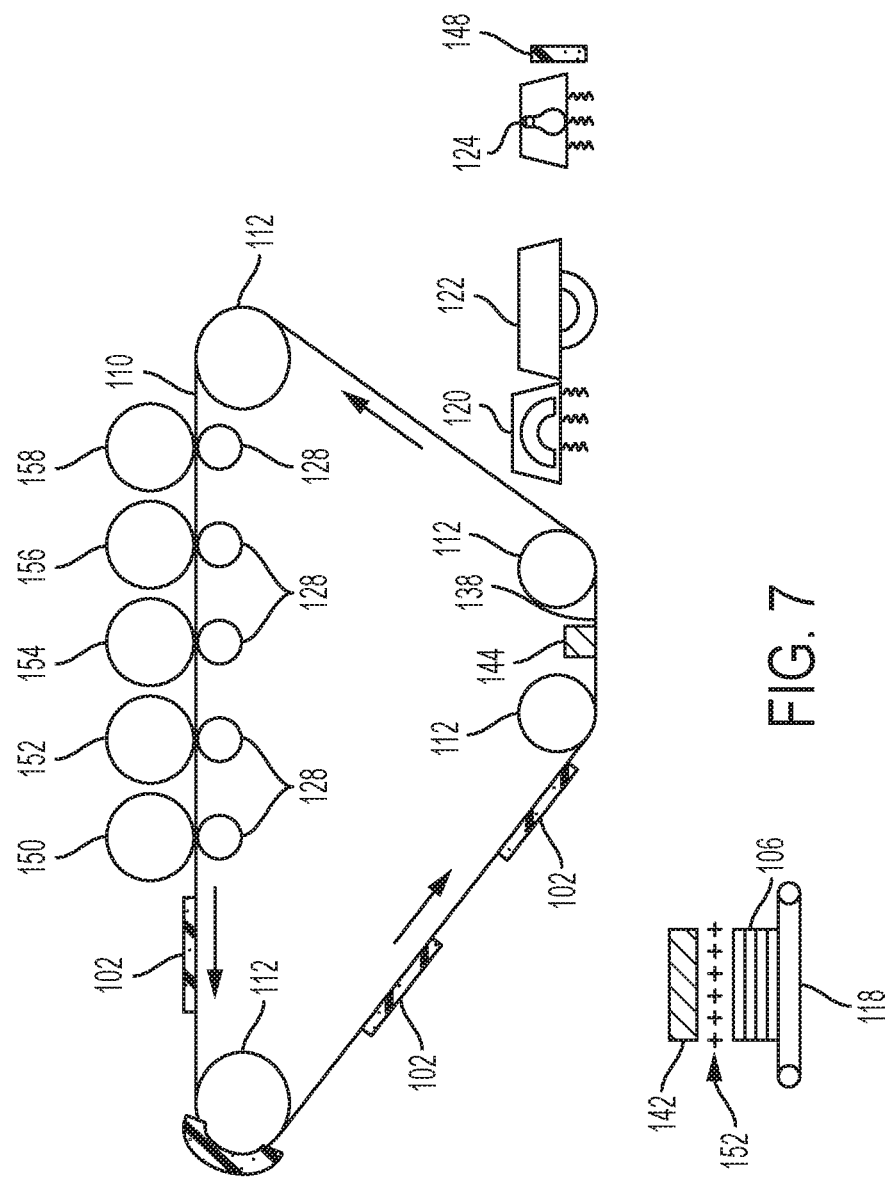
FIGS. 7-23 are schematic cross-section diagrams partially illustrating devices herein.
Figure 8:
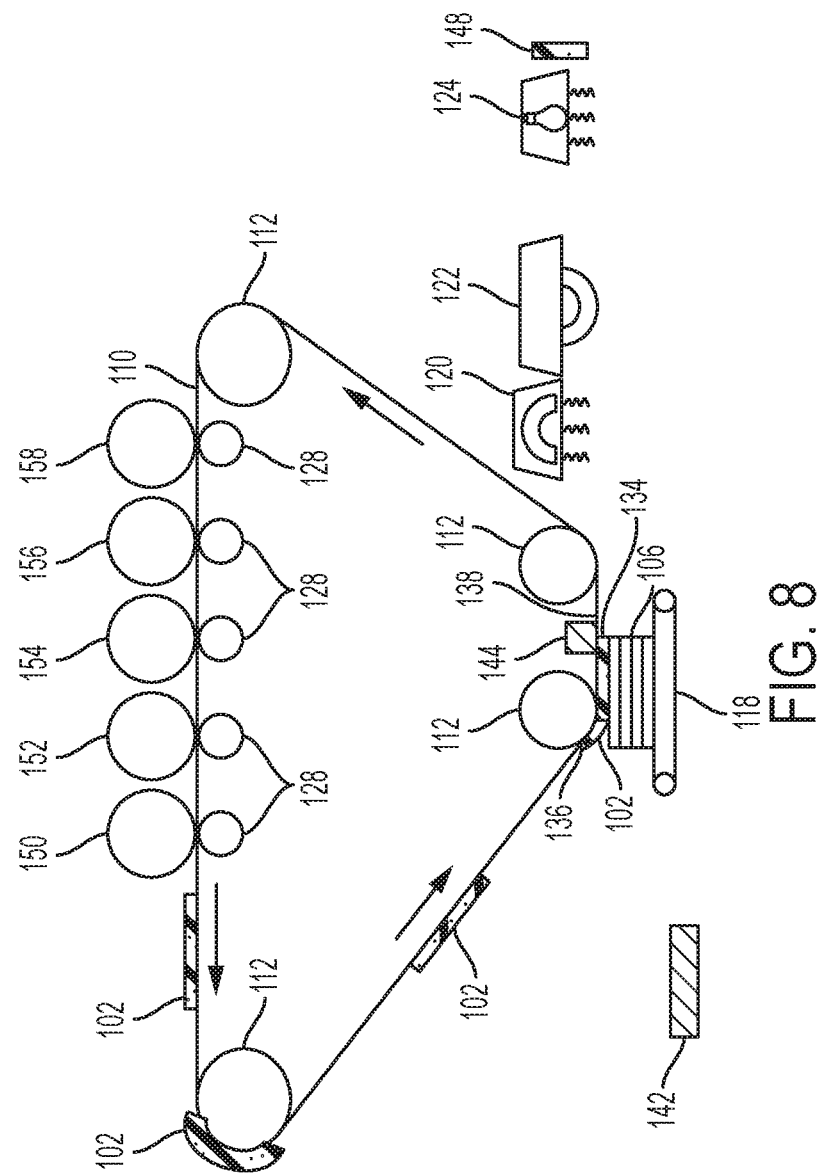
Figure 9:
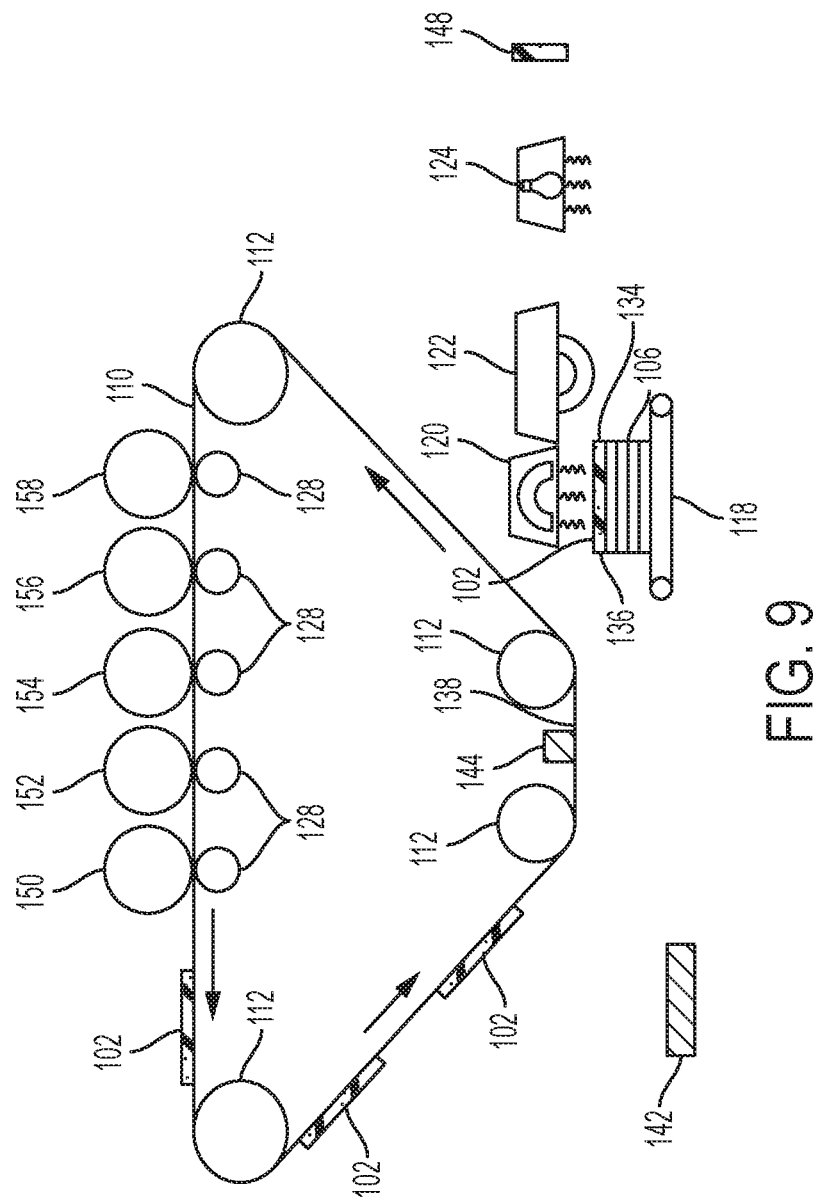

As the stack 106 of the developed layers 102 grows, additional developed layers 102 are formed on top of the stack 106, as shown in FIG. 7, and such additional developed layers 102 are heated by the heater 120, as shown in FIG. 8, and pressed by the pressure roller 122, as shown in FIG. 9, to bond/fuse all the develop layers 102 within the stack 106 together.

However, at some point, the height of the stack 106 will make the distance between the charged (build and support) particles 102 greater than the ability of the opposite charges 152 to attract the charged particles 102 (and this height will vary, depending upon the strength of the various charges), as shown in FIG. 6. However, the transmission device 144 is useful because the transmission device 144 can be an acoustic device vibrating the ITB 110 using acoustic waves. In other words, in additional to the electrostatic forces of the charges 152, the transmission device 144 also physically vibrates the layers 102 off the ITB 110 and on to the existing stack 106 on the platen 118.

For example, the transmission device 144 can be a resonator suitable for generating vibratory energy arranged in line contact with the back side of the ITB 110 surface for uniformly applying vibratory energy to the ITB 110 such that the layers 102 will be released from the forces adhering it to the ITB 110 at the transfuse station 138 by means of electrostatic (e.g., charges 152) and mechanical forces. Thus, the layers 102 are transferred across the transfuse station 138 gap by the combination of vibratory energy and the electrostatic transfer forces, despite the fact that the charge 152 on the opposite side of the platen 118 would not normally be sufficient to attract the layers 102 to the top of the stack 106.

Also, as shown in FIG. 7, to further aid in transfer of the layers 102 at the transfuse station 138, the charge generator 142 is positioned adjacent the transfuse station 138, and the platen 118 moves to a location to transfer a charge 152 to the layers 102 on the platen 118 (e.g., the top layer in the stack 106) after the heater 120 heats the layers 102 and the pressure roller 122 presses the layers 102. Therefore, just before returning to the transfuse station 138 (e.g., after any heating, pressing, curing, etc.) the platen 118 moves to the charge generator 142 to acquire an electrostatic charge 152 that will help electrostatically attract the next layer 102 to the top layer of the stack 106 (and then the platen 118 immediately moves to the transfuse station 138 before much of the electrostatic charge 152 can dissipate).

Here, the "top" layer in the stack is the layer 102 that is furthest away from the platen 118, and correspondingly, the layer 102 that contacts the platen 118 is the "bottom" layer in the stack 106. The charge generator 142 can be any type of charge generating device, such as a corona charge device generating charges and projecting (spraying) the charges. The charge 152 generated by the charge generator 142 is opposite the charge of particles of the build materials and the support material 102 on the ITB, and operates in a similar manner to that shown in FIG. 6.

Figure 10:
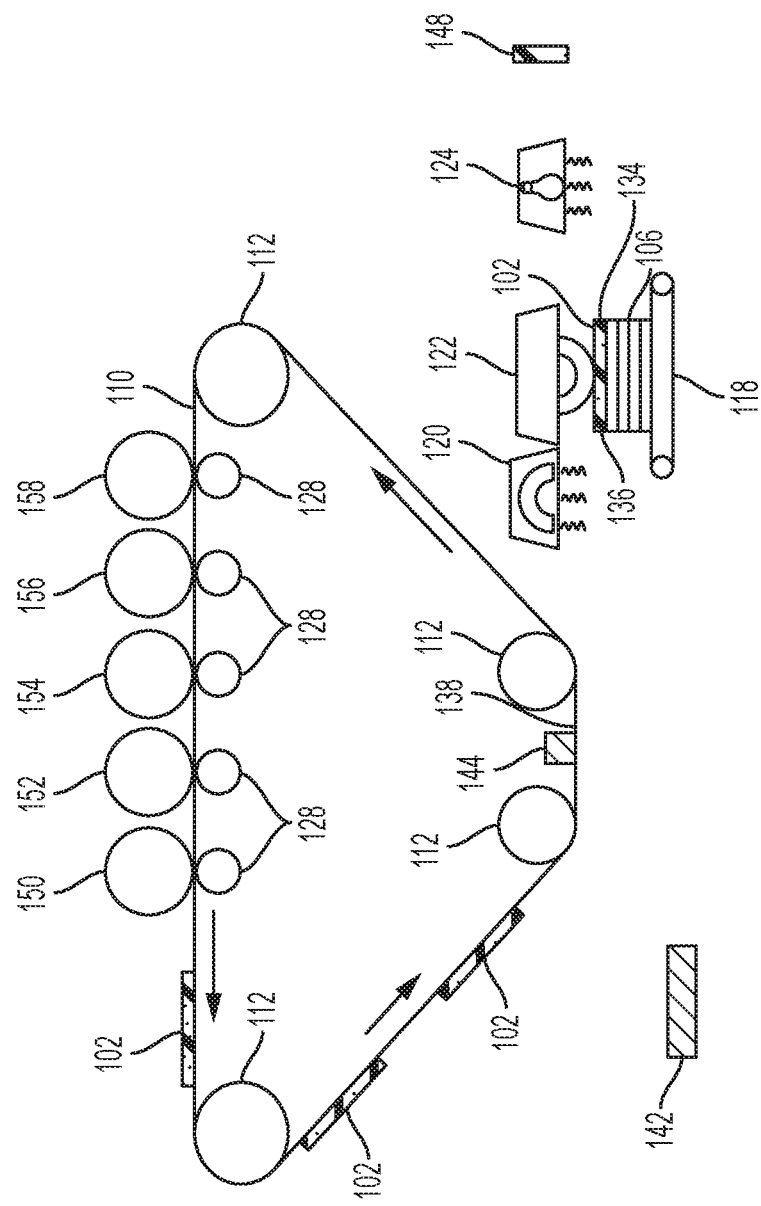
Figure 11:
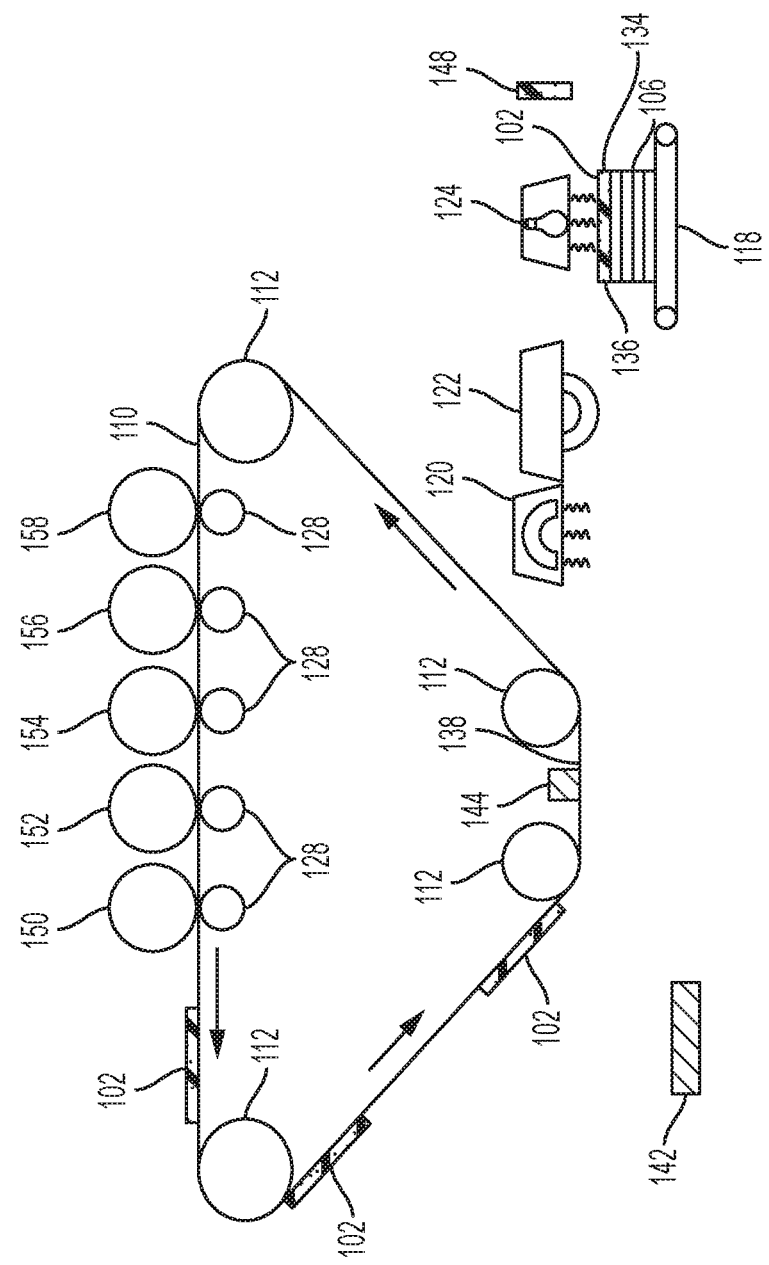

Then, in a similar processing shown in FIGS. 2-5, additional layers 102 are transferred to the top of the existing stack 106 of layers 102 (FIG. 8); the platen 118 moves to the heater 120 (FIG. 9) the platen 118 moves to the pressure roller 122 (FIG. 10) to lightly fuse each of the additionally formed layers 102 to the existing layers 102 of the stack 106 on the platen 118. As shown in FIG. 11, the platen 118 moves to the curing station 124 that is configured to apply light and/or heat to the 3-D structure to cure the developed layers 102 into the freestanding stack 106 on the platen 118. The selective use of heaters, lights, and other components of the curing station 124 will vary depending upon the chemical makeup of the developed layers 102.

In one example, the build material 104 can be a UV curable toner. Curing station 124 cures such materials by heating the materials to a temperature between their glass transition temperature and their melting temperature, and applying UV light to cross-link polymers within at least the build materials (and possibly within the support materials also) thereby creating a rigid structure. Those ordinarily skilled in the art would understand that other build and support materials could utilize other bonding processing and bonding components, and that the foregoing is presented only as one limited example; and the devices and methods herein are applicable to all such bonding methods and components, whether currently known or developed in the future.

Figure 12:
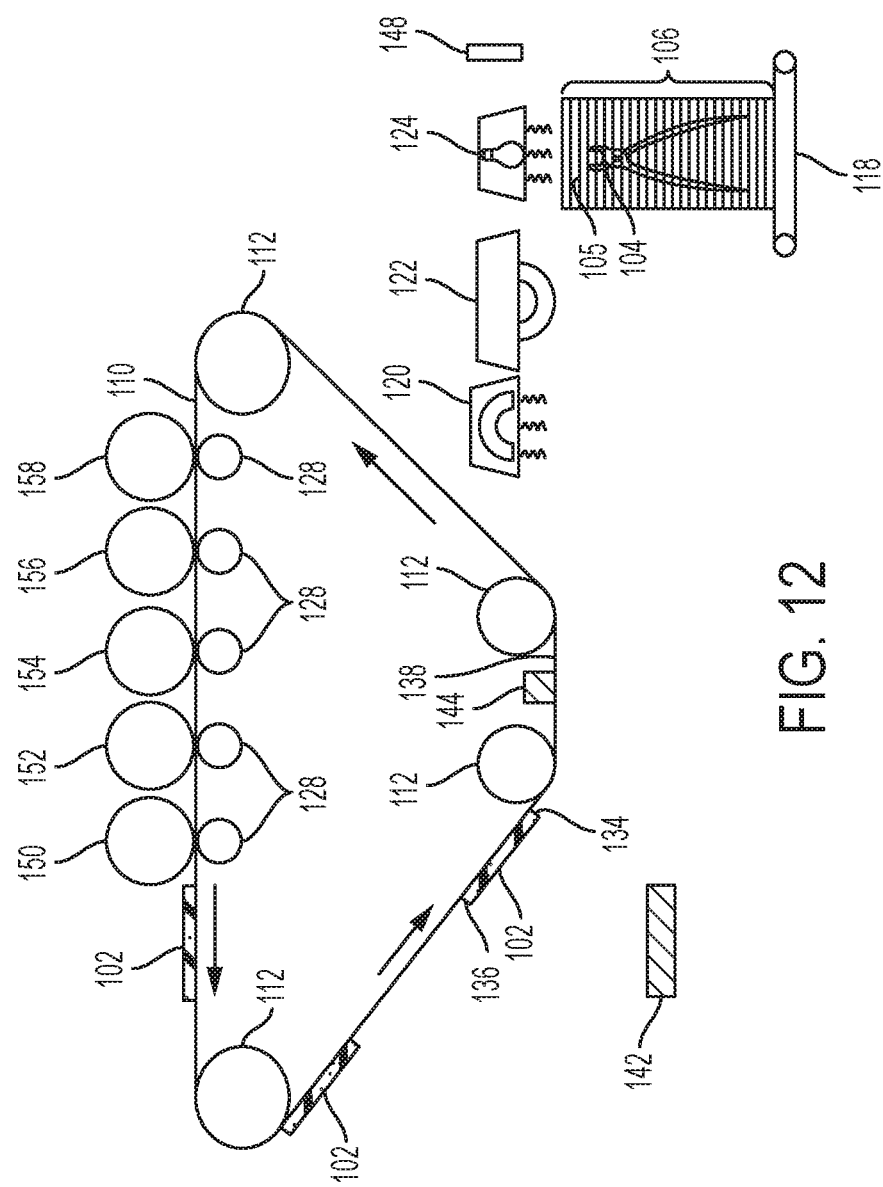
Figure 13:
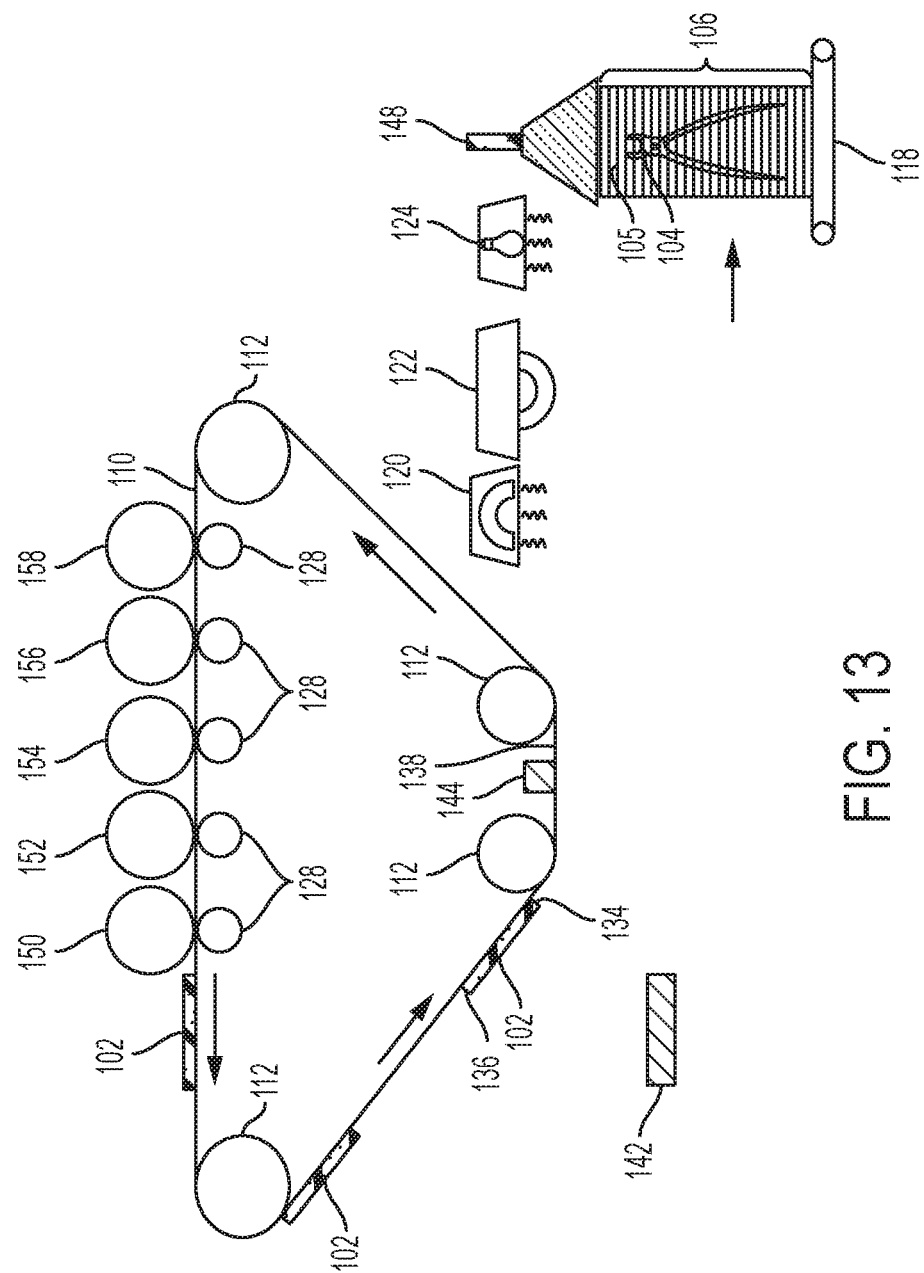

Therefore, the curing station 124 can apply light and/or heat after each time the ITB 110 transfers a layer 102 to the platen 118, to independently cure each layer 102 or the layers 102 can be cured in groups, or the curing station 124 may not be utilized until the entire freestanding stack 106 is completely formed, as shown in FIG. 12. In FIG. 12 an overlay is illustrated showing portions of support material 105 and build material 104 within the freestanding stack 106. Such may or may not be visible, and is only illustrated to show one exemplary way in which such build and support materials may be arranged.

Figure 14:
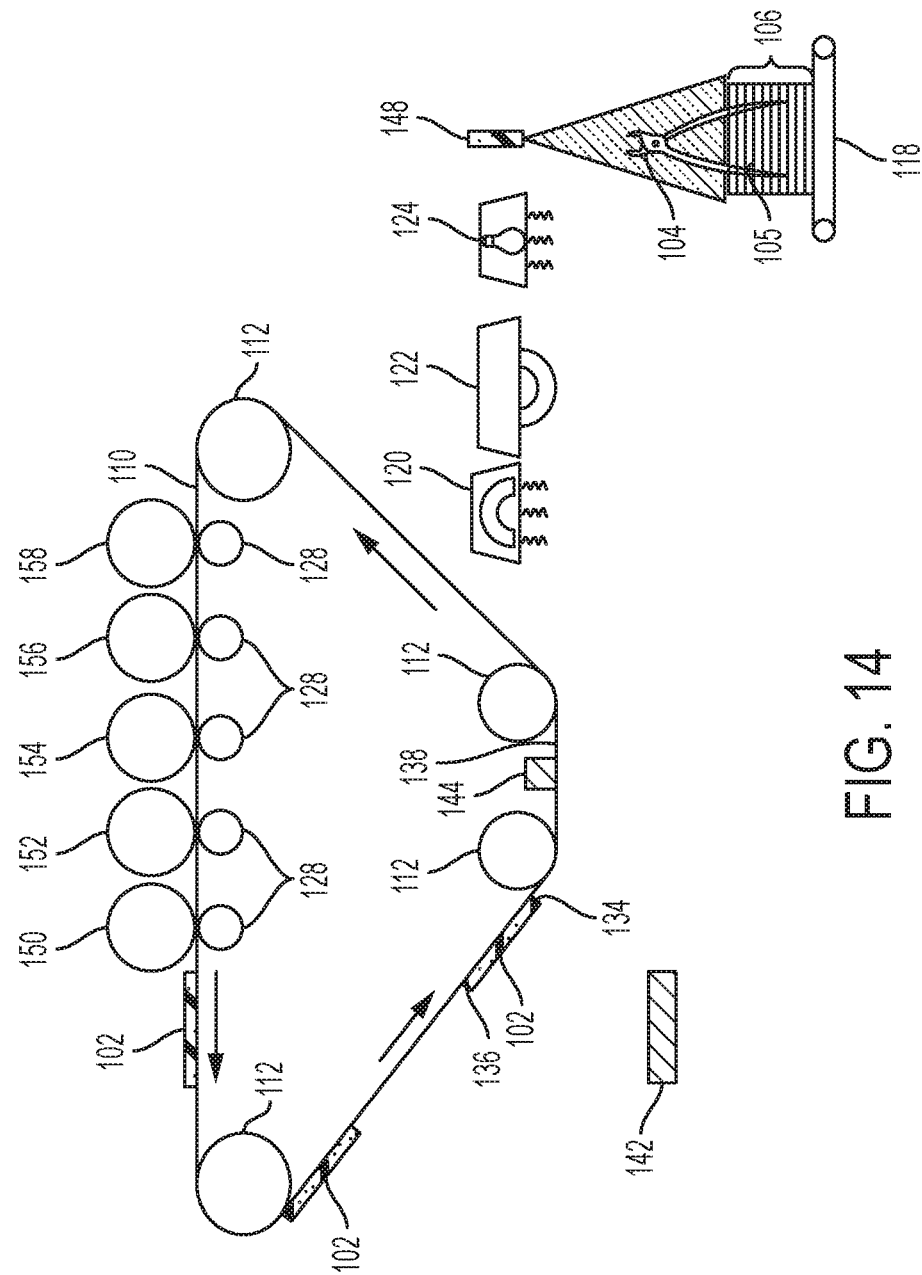
Figure 15:
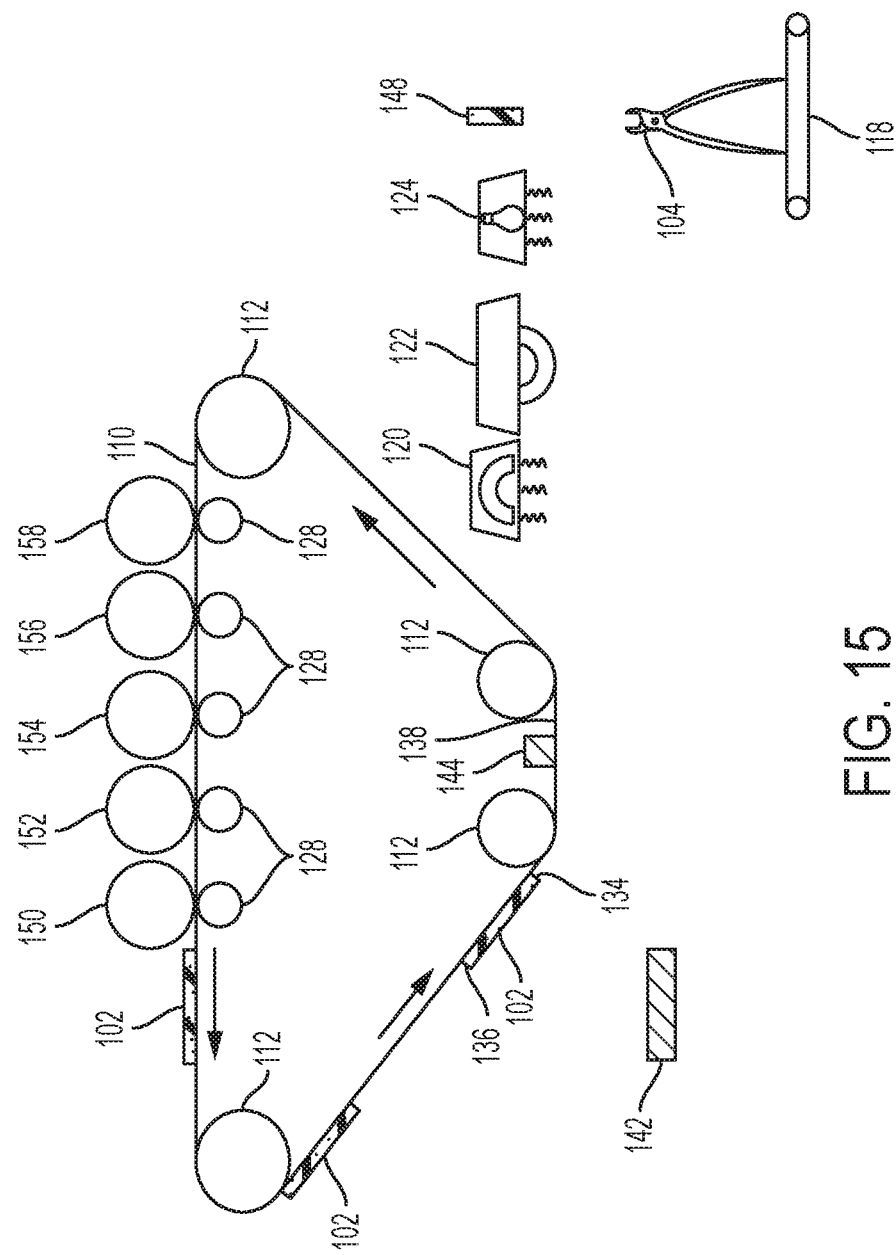
Figure 16:
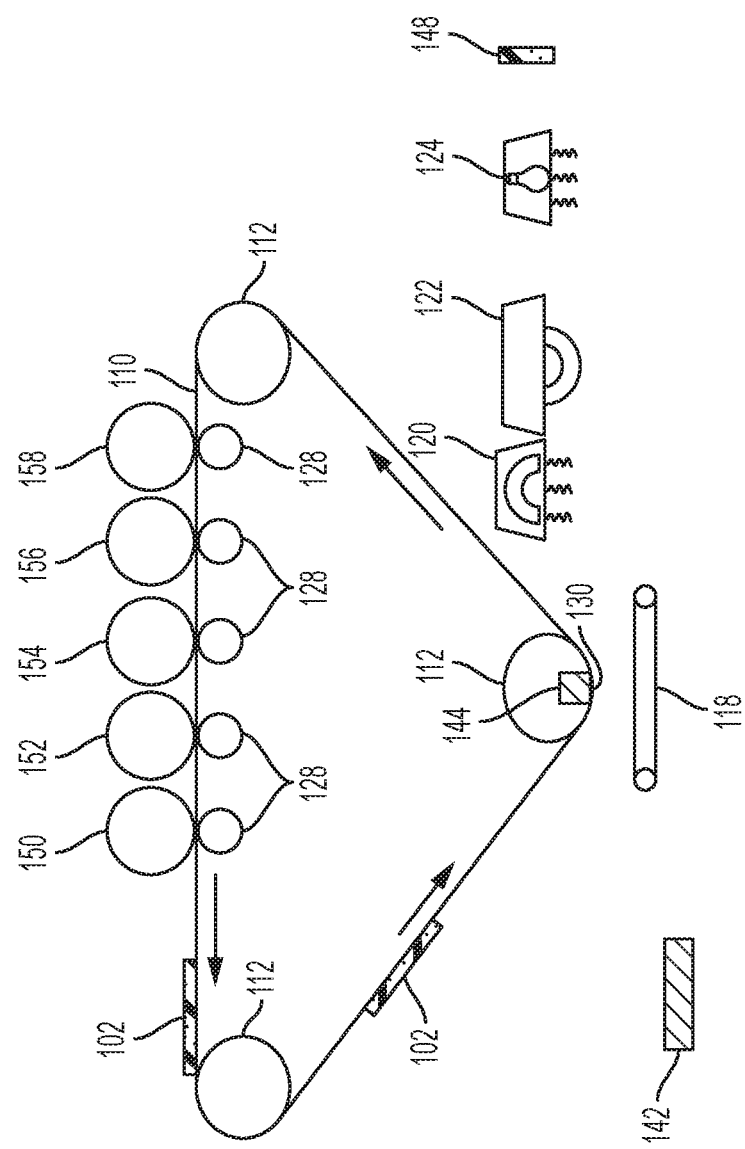
Figure 17:
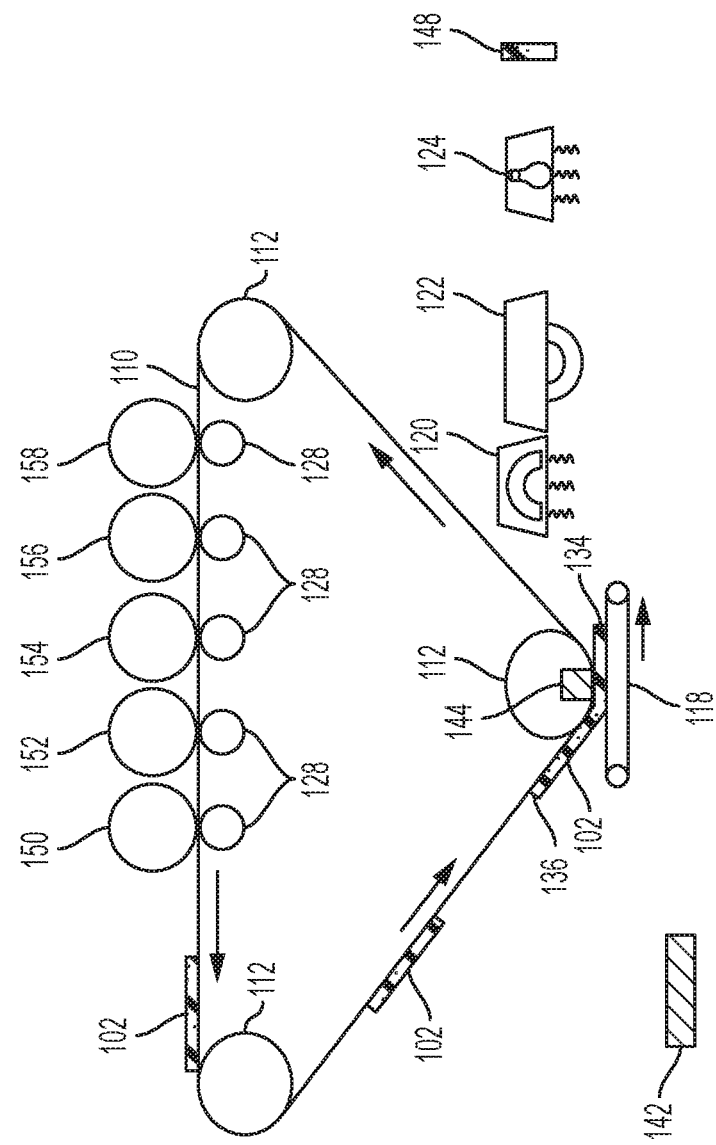

The 3-D structure in the freestanding stack 106 can be output to allow manual removal of the support material 105 using an external solvent bath; or processing can proceed as shown in FIG. 13-17. More specifically, in FIG. 13, the support material removal station 148 is positioned to receive the now bonded 3-D structure (freestanding stack 106) on the platen 118. The support material removal station 148 applies a solvent 146 that dissolves the support material 105 without affecting the build material 104. Again, as noted above, the solvent utilized will depend upon the chemical makeup of the build material 104 and the support material 105. FIG. 14 illustrates the processing where about half of the support material 105 remains, and a portion of the build material 104 protrudes from the remaining stack of support material 105. FIG. 15 illustrates processing after the support material removal station 148 has applied sufficient solvent 146 to dissolve all the support material 105, leaving only the build material 104 remaining, which leave a completed 3-D structure made of only the build material 104.

FIGS. 16-21 illustrate an alternative 3-D electrostatic printing structure herein which includes a transfuse nip 130 in place of the planar transfuse station 138 shown in FIGS. 1-16. As shown in FIG. 1, the planar transfuse station 138 is a planar portion of the ITB 110 that is between rollers 112 and is parallel to the platen 118; while in FIG. 16, the transfuse nip 130 presents a single point of transfer.

Figure 18:
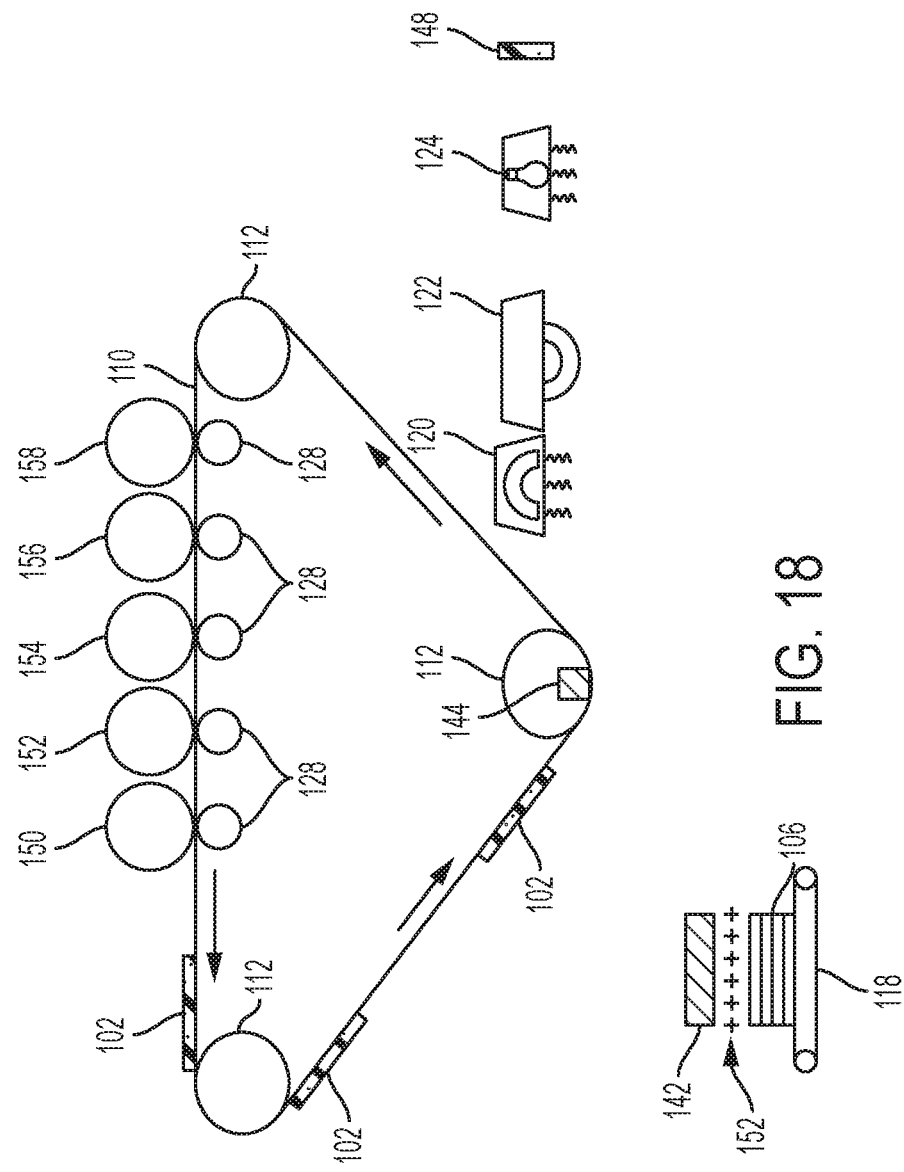
Figure 19:
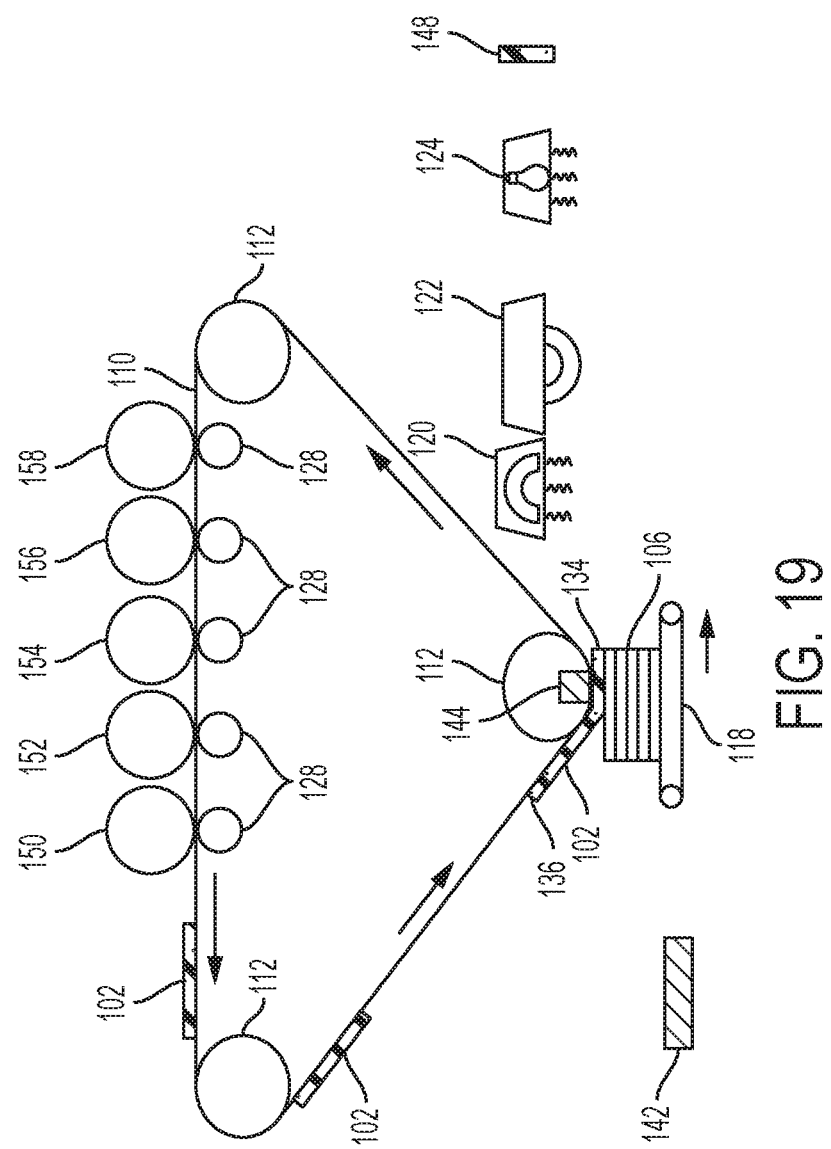
Figure 20:
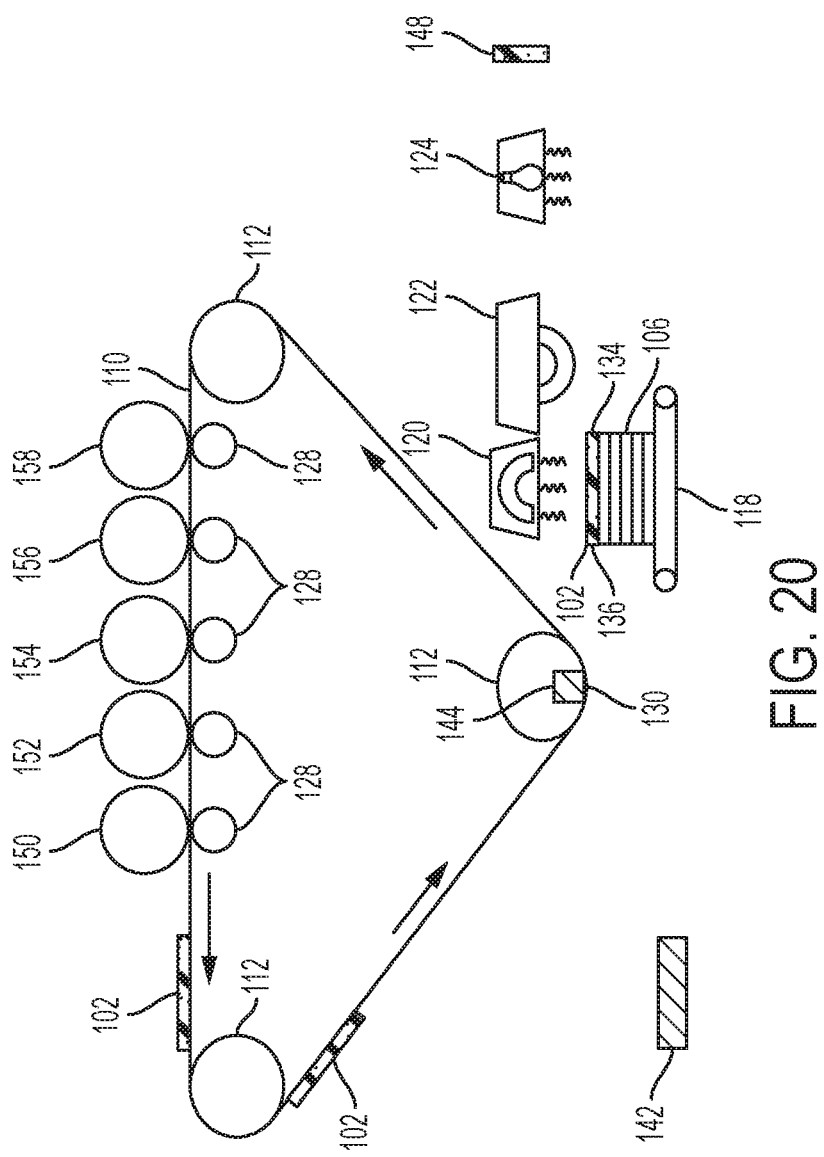
Figure 21:
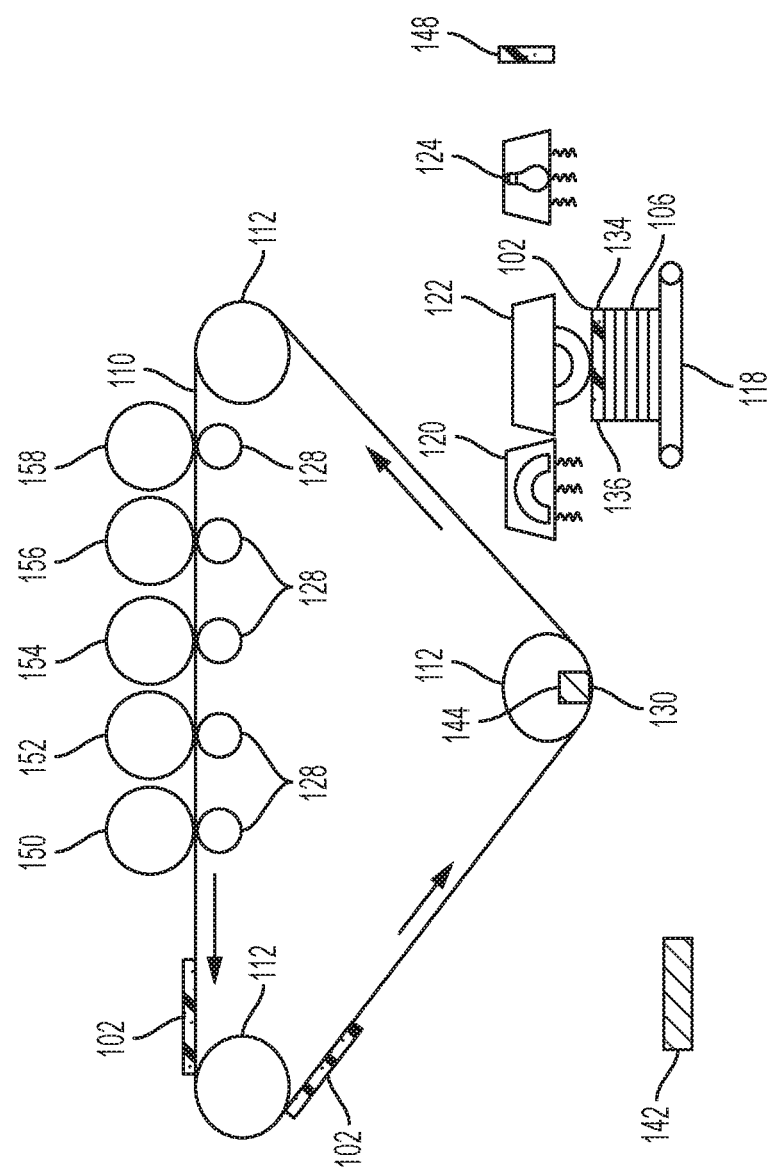
Figure 22:
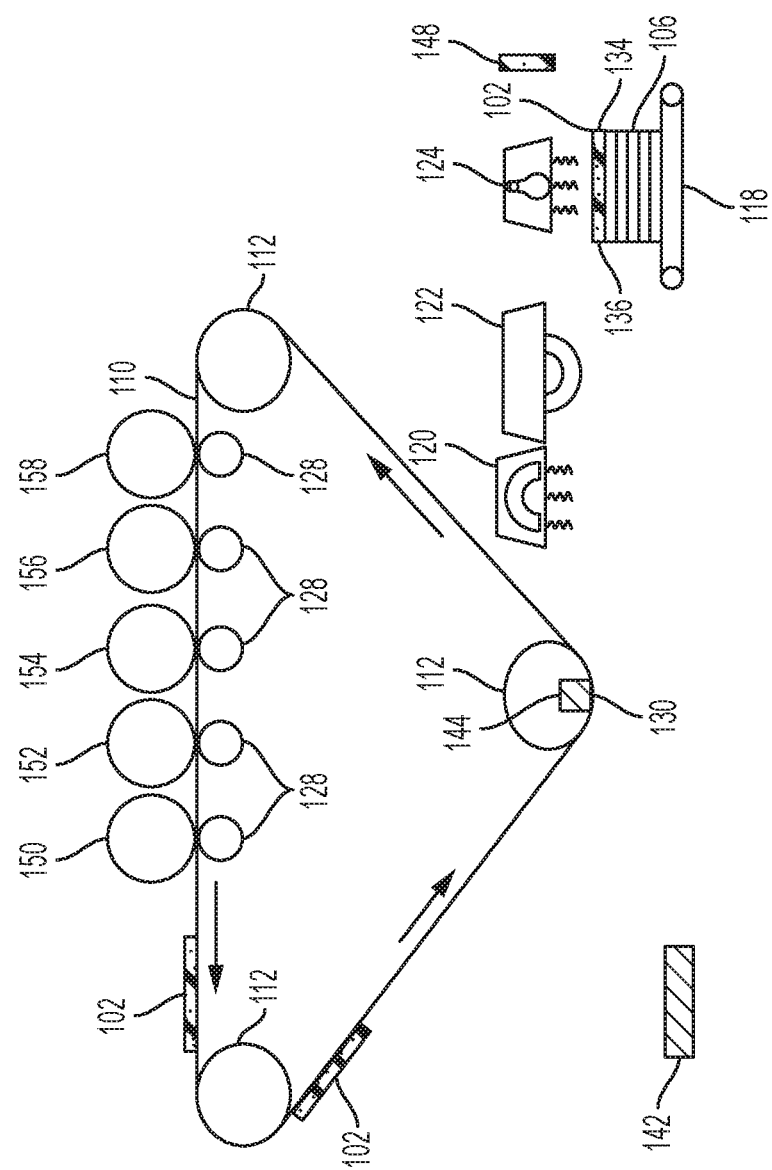

In similar operations to that discussed above, as shown in FIG. 17 the platen 118 moves synchronously with the ITB 110 to have each layer 102 transfer onto the platen 118 cleanly and without smearing, and such processing is repeated to eventually form a stack 106 of the layers 102. As noted above, immediately before moving to the transfuse nip 130 to acquire another layer 102 in FIG. 19 (e.g., after any heating, pressing, curing, etc.) as shown in FIG. 18, the platen 118 can move to the charge generator 142 in order to provide charge 152 to the top layer 102 within the stack 106. After transferring each successive layer 102 to the platen 118 (FIG. 19), each layer 102 (or groups of layers 102 in a stack 106) are heated by the heater 120, and pressed by the pressure roller 122, as shown in FIGS. 20 and 21. Eventually, as discussed above, the stack 106 of layers 102 is cured using the curing station 124, as shown in FIG. 22. Additionally, all other processing mentioned above can be performed using the structure shown in FIGS. 16-22.

Figure 23:
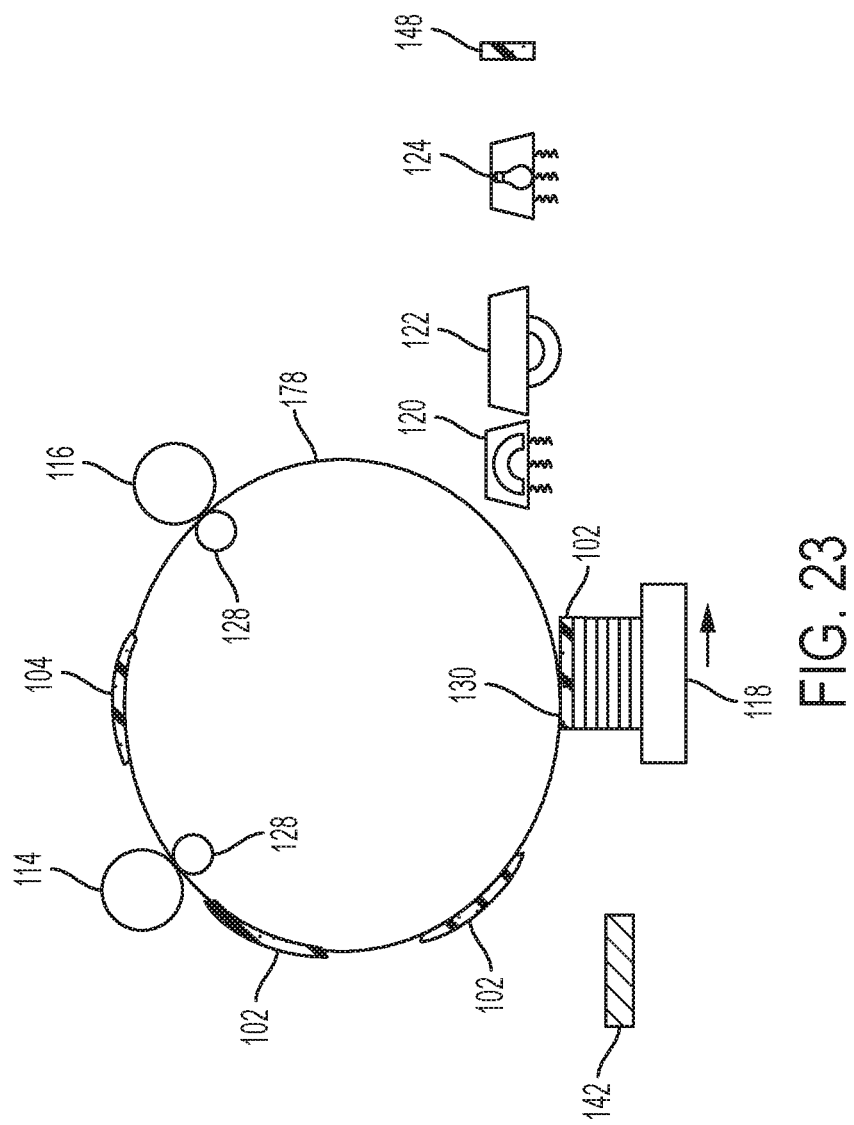

Similarly, as shown in FIG. 23, a drum 178 could be used in place of the ITB 110, with all other components operating as described herein. Thus, the drum 178 could be an intermediate transfer surface receiving material from development stations 114, 116, as described above, or could be a photoreceptor and operate as the photoreceptor 256 described below operates, by maintaining a latent image of charge and receiving materials from development devices 254.

Figure 24:
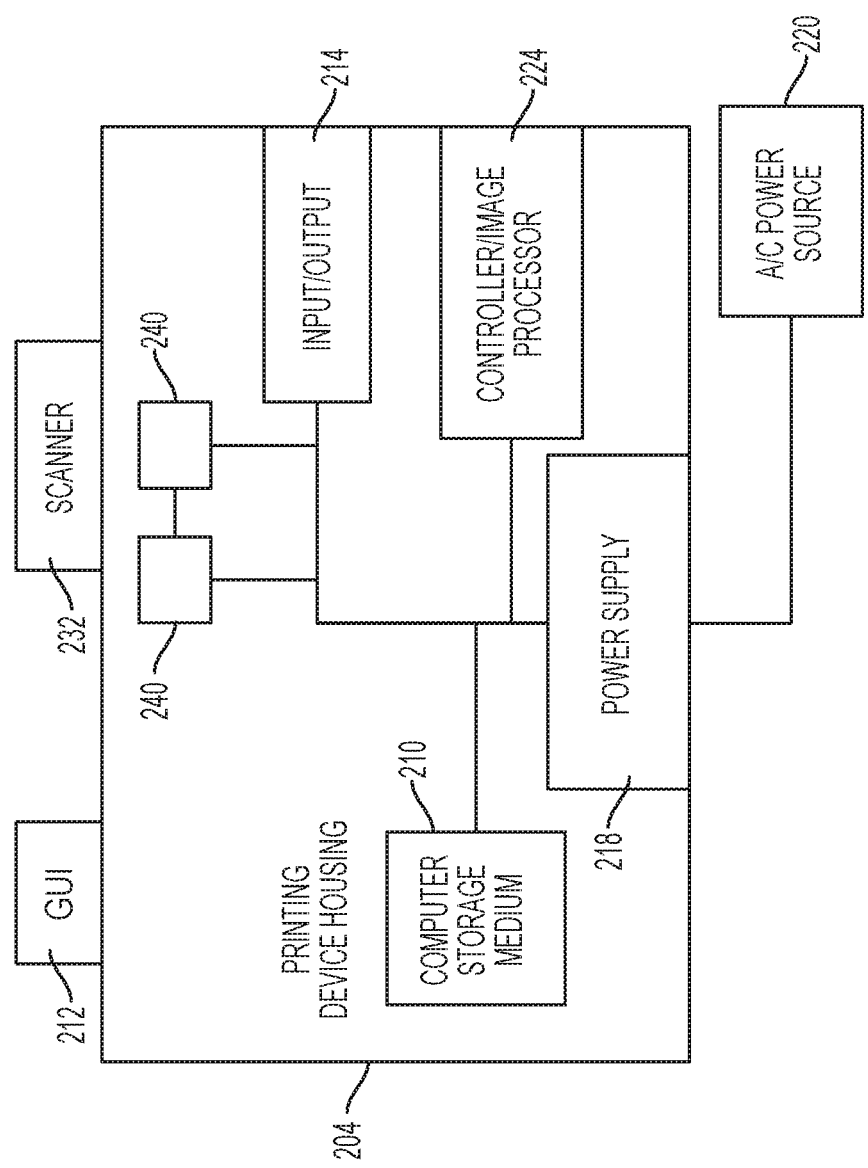
FIG. 24 is a schematic cross-section diagram partially illustrating printing devices herein.

FIG. 24 illustrates many components of 3-D printer structures 204 herein. The 3-D printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the 3-D printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 21, a body housing has one or more functional components that operate on power supplied from an alternating current (AC) source 220 by the power supply 218. The power supply 218 can comprise a common power conversion unit, power storage element (e.g., a battery, etc), etc.

The 3-D printing device 204 includes at least one marking device (printing engine(s)) 240 that deposits successive layers of build and support material on a platen as described above, and are operatively connected to a specialized image processor 224 (that is different than a general purpose computer because it is specialized for processing image data). Also, the printing device 204 can include at least one accessory functional component (such as a scanner 232) that also operates on the power supplied from the external power source 220 (through the power supply 218).

Figure 25:
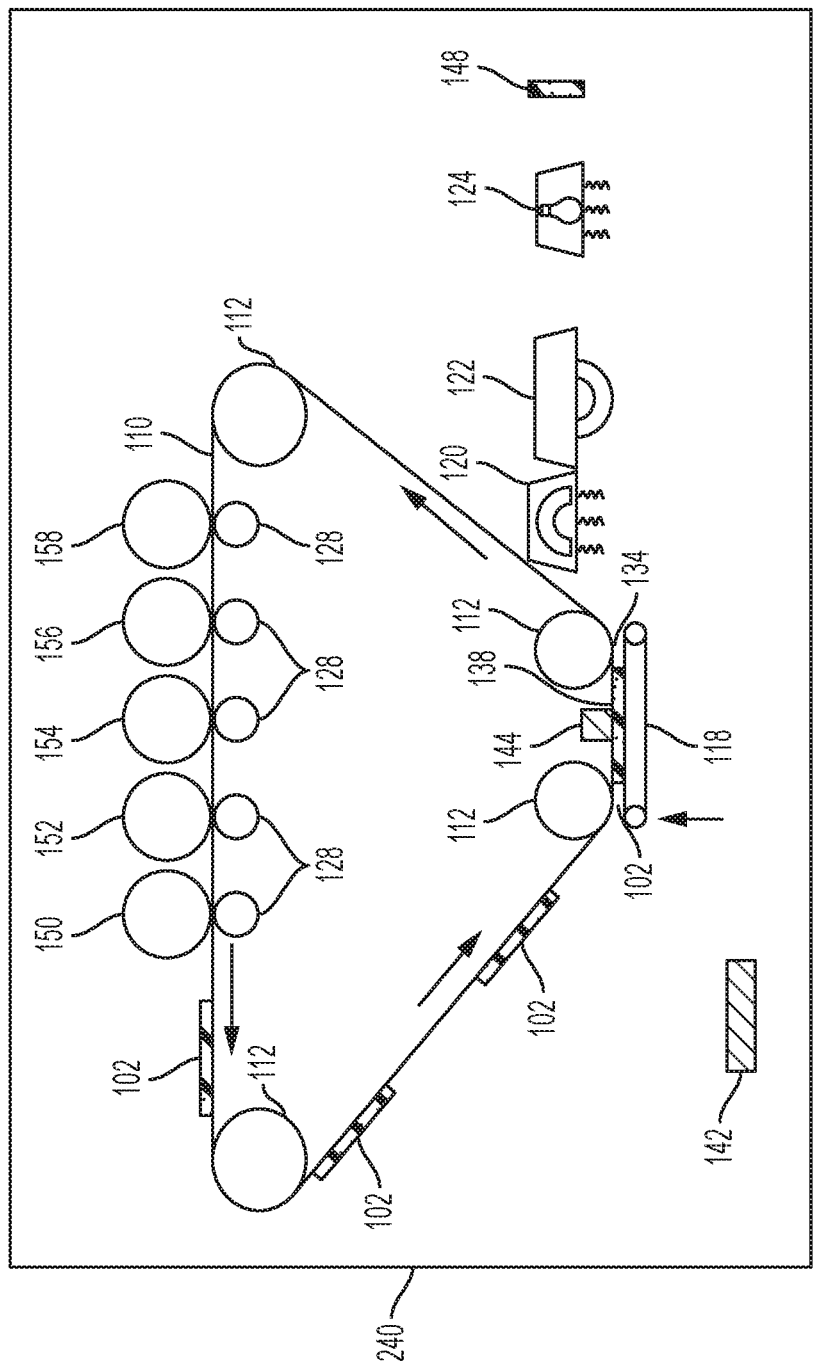
FIG. 25 is a schematic cross-section diagram partially illustrating devices herein.

The one or more printing engines 240 are intended to illustrate any marking device that applies build and support materials (toner, etc.) whether currently known or developed in the future and can include, for example, devices that use an intermediate transfer belt 110 (as shown in FIG. 25).

Thus, as shown in FIG. 25, each of the printing engine(s) 240 shown in FIG. 24 can utilize one or more potentially different (e.g., different color, different material, etc.) build material development stations 152-158, one or more potentially different support material development stations 150, etc. The development stations 150-158 can be any form of development station, whether currently known or developed in the future, such as individual electrostatic marking stations, individual inkjet stations, individual dry ink stations, etc. Each of the development stations 150-158 transfers a pattern of material to the same location of the intermediate transfer belt 110 in sequence during a single belt rotation (potentially independently of a condition of the intermediate transfer belt 110) thereby, reducing the number of passes the intermediate transfer belt 110 must make before a full and complete image is transferred to the intermediate transfer belt 110. While FIG. 25 illustrates five development stations adjacent or in contact with a rotating belt (110), as would be understood by those ordinarily skilled in the art, such devices could use any number of marking stations (e.g., 2, 3, 5, 8, 11, etc.).

Figure 26:
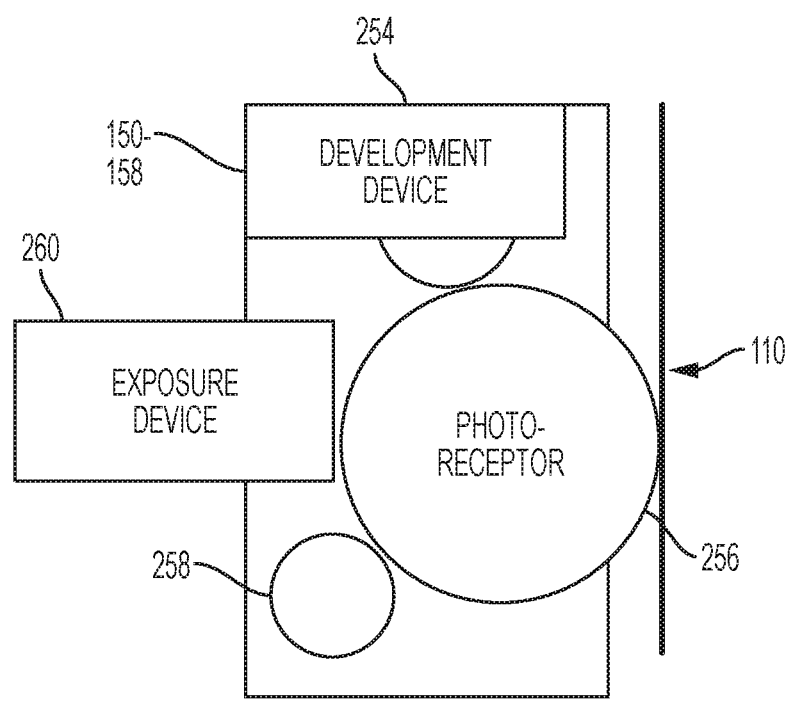
FIG. 26 is a schematic cross-section diagram partially illustrating development devices herein.

One exemplary individual electrostatic development station 150-158 is shown in FIG. 26 positioned adjacent to (or potentially in contact with) intermediate transfer belt 110. Each of the individual electrostatic development stations 150-158 includes its own charging station 258 that creates a uniform charge on an internal photoreceptor 256, an internal exposure device 260 that patterns the uniform charge into a patterned charge on the photoreceptor, and an internal development device 254 that transfers build or support material to the photoreceptor 256.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

As shown in U.S. Pat. No. 8,488,994, an additive manufacturing system for printing a 3-D part using electrophotography is known. The system includes a photoconductor component having a surface, and a development station, where the development station is configured to developed layers of a material on the surface of the photoconductor component. The system also includes a transfer medium configured to receive the developed layers from the surface of the rotatable photoconductor component, and a platen configured to receive the developed layers from the transfer component in a layer-by-layer manner to print the 3-D part from at least a portion of the received layers.

With respect to UV curable toners, as disclosed in U.S. Pat. No. 7,250,238 it is known to provide a UV curable toner composition, as are methods of utilizing the UV curable toner compositions in printing processes. U.S. Pat. No. 7,250,238 discloses various toner emulsion aggregation processes that permit the generation of toners that in embodiments can be cured, that is by the exposure to UV radiation, such as UV light of has about 100 nm to about 400 nm. In U.S. Pat. No. 7,250,238, the toner compositions produced can be utilized in various printing applications such as temperature sensitive packaging and the production of foil seals. In U.S. Pat. No. 7,250,238 embodiments relate to a UV curable toner composition comprised of an optional colorant, an optional wax, a polymer generated from styrene, and acrylate selected from the group consisting of butyl acrylate, carboxyethyl acrylate, and a UV light curable acrylate oligomer. Additionally, these aspects relate to a toner composition comprised of a colorant such as a pigment, an optional wax, and a polymer generated from a UV curable cycloaliphatic epoxide.

Moreover, U.S. Pat. No. 7,250,238 discloses a method of forming a UV curable toner composition comprising mixing a latex containing a polymer formed from styrene, butyl acrylate, a carboxymethyl acrylate, and a UV curable acrylate with a colorant and wax; adding flocculant to this mixture to optionally induce aggregation and form toner precursor particles dispersed in a second mixture; heating the toner precursor particles to a temperature equal to or higher than the glass transition temperature (Tg) of the polymer to form toner particles; optionally washing the toner particles; and optionally drying the toner particles. A further aspect relates to the toner particles produced by this method.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

For the purposes of this invention, the term fixing means the drying, hardening, polymerization, crosslinking, binding, or addition reaction or other reaction of the coating. In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A three-dimensional (3-D) printer comprising:
an intermediate transfer surface;
color development stations positioned to electrostatically transfer build materials having different colors to said intermediate transfer surface;
a support material development station positioned to electrostatically transfer a support material to a location of said intermediate transfer surface where said build materials are located on said intermediate transfer surface, said support material dissolves in different solvents relative to solvents that dissolve said build materials;
a transfuse station comprising a roller on a first side of said intermediate transfer surface supporting said intermediate transfer surface, and a transmission device on said first side of said intermediate transfer surface;
a platen moving relative to said intermediate transfer surface, said intermediate transfer surface electrostatically transfers a layer of said build materials and said support material to said platen each time said platen contacts a second side of said intermediate transfer surface at said transfuse station to successively form layers of said build materials and said support material on said platen, each of said layers is on a discrete area of said intermediate transfer surface and is in a pattern, and said first side being opposite said second side;
a heater adjacent said platen, said platen moves to said heater to heat said layers and join each of said layers together;
a pressure roller adjacent said heater, said platen moves to said pressure roller to press each of said layers together;
a charge generator positioned adjacent said transfuse station and positioned to transfer a charge to said layers on said platen after said heater heats said layers and said pressure roller presses said layers; and
a curing station positioned to apply light to said layers to cure said layers to one another on said platform.

2. The 3-D printer according to claim 1, said transmission device comprising an acoustic device vibrating said intermediate transfer surface using acoustic waves.

3. The 3-D printer according to claim 1, said transmission device physically vibrating said layers off said intermediate transfer surface and on to said platen.

4. The 3-D printer according to claim 1, said charge generator transferring said charge to the top layer of said layers positioned on said platen.

5. The 3-D printer according to claim 1, said charge generated by said charge generator being opposite a charge of particles of said build materials and said support material on said intermediate transfer surface.

6. The 3-D printer according to claim 1, said heater heats said layers and said pressure roller presses said layers after each time said intermediate transfer surface transfers each of said layers to said platen.

7. The 3-D printer according to claim 1, further comprising a support material removal station positioned to receive said layers from said platform, said support material removal station applies a solvent that dissolves said support material without affecting said build materials to leave said layers made of only said build materials.

8. A three-dimensional (3-D) printer comprising:
- an intermediate transfer surface;
- a first color development station positioned to electrostatically transfer a first color material to said intermediate transfer surface;
- a second color development station positioned to electrostatically transfer a second color material, having a different color than said first color material, to said intermediate transfer surface;
- a support material development station positioned to electrostatically transfer a support material to a location of said intermediate transfer surface where said first color material and said second color material are located on said intermediate transfer surface, said support material dissolves in different solvents relative to solvents that dissolve said first color material and said second color material;
- a transfuse station comprising a roller on a first side of said intermediate transfer surface supporting said intermediate transfer surface, and a transmission device on said first side of said intermediate transfer surface;
- a platen moving relative to said intermediate transfer surface, said intermediate transfer surface electrostatically transfers a layer of said first color material, said second color material, and said support material to said platen each time said platen contacts a second side of said intermediate transfer surface at said transfuse station to successively form layers of said first color material, said second color material, and said support material on said platen, each of said layers is on a discrete area of said intermediate transfer surface and is in a pattern, and said first side being opposite said second side;
- a heater adjacent said platen, said platen moves to said heater to heat said layers and join each of said layers together;
- a pressure roller adjacent said heater, said platen moves to said pressure roller to press each of said layers together;
- a charge generator positioned adjacent said transfuse station and positioned to transfer a charge to said layers on said platen after said heater heats said layers and said pressure roller presses said layers; and
- a curing station positioned to apply light to said layers to cure said layers to one another on said platform.

9. The 3-D printer according to claim 8, said transmission device comprising an acoustic device vibrating said intermediate transfer surface using acoustic waves.

10. The 3-D printer according to claim 8, said transmission device physically vibrating said layers off said intermediate transfer surface and on to said platen.

11. The 3-D printer according to claim 8, said charge generator transferring said charge to the top layer of said layers positioned on said platen.

12. The 3-D printer according to claim 8, said charge generated by said charge generator being opposite a charge of particles of said build materials and said support material on said intermediate transfer surface.

13. The 3-D printer according to claim 8, said heater heats said layers and said pressure roller presses said layers after each time said intermediate transfer surface transfers each of said layers to said platen.

14. The 3-D printer according to claim 8, further comprising a support material removal station positioned to receive said layers from said platform, said support material removal station applies a solvent that dissolves said support material without affecting said build materials to leave said layers made of only said build materials.

15. A three-dimensional (3-D) printer comprising:
- an intermediate transfer belt (ITB);
- color development stations positioned to electrostatically transfer ultraviolet (UV) curable build materials having different colors to said ITB;
- a support material development station positioned to electrostatically transfer a support material to a location of said ITB where said build materials are located on said ITB, said support material dissolves in different solvents relative to solvents that dissolve said build materials;
- a transfuse station comprising a roller on a first side of said ITB supporting said ITB, and a transmission device on said first side of said ITB;
- a platen moving relative to said ITB, said ITB electrostatically transfers a layer of said build materials and said support material to said platen each time said platen contacts a second side of said ITB at said transfuse station to successively form layers of said build materials and said support material on said platen, each of said layers is on a discrete area of said ITB and is in a pattern, and said first side being opposite said second side;
- a heater adjacent said platen, said platen moves to said heater to heat said layers and join each of said layers together;
- a pressure roller adjacent said heater, said platen moves to said pressure roller to press each of said layers together;
- a charge generator positioned adjacent said transfuse station and positioned to transfer a charge to said layers on said platen after said heater heats said layers and said pressure roller presses said layers; and
- a curing station positioned to apply UV light to said layers to cure said layers to one another on said platform.

16. The 3-D printer according to claim 15, said transmission device comprising an acoustic device vibrating said ITB using acoustic waves.

17. The 3-D printer according to claim 15, said transmission device physically vibrating said layers off said ITB and on to said platen.

18. The 3-D printer according to claim 15, said charge generator transferring said charge to the top layer of said layers positioned on said platen.

19. The 3-D printer according to claim 15, said charge generated by said charge generator being opposite a charge of particles of said build materials and said support material on said ITB.

20. The 3-D printer according to claim 15, said heater heats said layers and said pressure roller presses said layers after each time said ITB transfers each of said layers to said platen.

\* \* \* \* \*